United States Patent
Carlson et al.

(10) Patent No.: US 8,103,912 B2
(45) Date of Patent: Jan. 24, 2012

(54) SEQUENCER AND TEST SYSTEM INCLUDING THE SEQUENCER

(75) Inventors: Gary Carlson, Alison Viejo, CA (US); Jeffrey Norris, Lake Forest, CA (US); Xiaokun Hu, Irvine, CA (US); Daniel Masters, Mission Viejo, CA (US); Timothy Elmore, Cypress, CA (US); Sylvester Yu, Anaheim, CA (US)

(73) Assignee: EADS North America, Inc., Irvine, CA (US)

( * ) Notice: Subject to any disclaimer, the term of this patent is extended or adjusted under 35 U.S.C. 154(b) by 183 days.

(21) Appl. No.: 12/584,374

(22) Filed: Sep. 5, 2009

(65) Prior Publication Data

US 2010/0070803 A1  Mar. 18, 2010

Related U.S. Application Data

(60) Provisional application No. 61/094,969, filed on Sep. 7, 2008.

(51) Int. Cl.
   *G06F 11/00* (2006.01)

(52) U.S. Cl. ................................................ 714/31
(58) Field of Classification Search .................. 714/31
   See application file for complete search history.

(56) References Cited

U.S. PATENT DOCUMENTS

| | | | |
|---|---|---|---|
| 6,473,831 B1 * | 10/2002 | Schade | 711/115 |
| 7,584,390 B2 * | 9/2009 | Vorbach et al. | 714/718 |
| 2007/0055846 A1 * | 3/2007 | Mendes et al. | 712/220 |
| 2009/0106591 A1 * | 4/2009 | Jeddeloh | 714/31 |
| 2010/0223512 A1 * | 9/2010 | Resnick | 714/718 |

* cited by examiner

*Primary Examiner* — Michael Maskulinski

(57) ABSTRACT

A test system 100 that can accept a plurality of plug-in electronic cards in Xi Slots 126 or PXI slots 134 is described. The test or source measure switching system 100 includes a sequencer or sequence engine 130 which is fully capable of executing opcode instructions having potentially indefinite completion times and monitoring multiple asynchronous inputs simultaneously without interrupts. The sequencer 130 is sequential and deterministic to approximately ten microsecond resolution.

22 Claims, 36 Drawing Sheets

BR = Bytes Required for next sample
ESM = End of Samples Memory
ETE = End of Table Entries
FVSS = First Valid Sample Start
FVTE = First Valid Table Entry
LVTE = Last Valid Table Entry
NASS = Next Available Sample Start
RAS = Result Address for Segment
SS = Sample Start
SSM = Start of Samples Memory
STE = Start of Table Entries
USI = Unique Segment Identifier BR = Bytes Required for next sample
ESM = End of Samples Memory
ETE = End of Table Entries
FVSS = First Valid Sample Start
FVTE = First Valid Table Entry
LVTE = Last Valid Table Entry
NASS = Next Available Sample Start
RAS = Result Address for Segment
SS = Sample Start
SSM = Start of Samples Memory
STE = Start of Table Entries
USI = Unique Segment Identifier BR = Bytes Required for next sample
ESM = End of Samples Memory
ETE = End of Table Entries
FVSS = First Valid Sample Start
FVTE = First Valid Table Entry
LVTE = Last Valid Table Entry
NASS = Next Available Sample Start
RAS = Result Address for Segment
SS = Sample Start
SSM = Start of Samples Memory
STE = Start of Table Entries
USI = Unique Segment Identifier BR = Bytes Required for next sample
ESM = End of Samples Memory
ETE = End of Table Entries
FVSS = First Valid Sample Start
FVTE = First Valid Table Entry
LVTE = Last Valid Table Entry
NASS = Next Available Sample Start
RAS = Result Address for Segment
SS = Sample Start
SSM = Start of Samples Memory
STE = Start of Table Entries
USI = Unique Segment Identifier BR = Bytes Required for next sample
ESM = End of Samples Memory
ETE = End of Table Entries
FVSS = First Valid Sample Start
FVTE = First Valid Table Entry
LVTE = Last Valid Table Entry
NASS = Next Available Sample Start
RAS = Result Address for Segment
SS = Sample Start
SSM = Start of Samples Memory
STE = Start of Table Entries
USI = Unique Segment Identifier BR = Bytes Required for next sample
ESM = End of Samples Memory
ETE = End of Table Entries
FVSS = First Valid Sample Start
FVTE = First Valid Table Entry
LVTE = Last Valid Table Entry
NASS = Next Available Sample Start
RAS = Result Address for Segment
SS = Sample Start
SSM = Start of Samples Memory
STE = Start of Table Entries
USI = Unique Segment Identifier BR = Bytes Required for next sample
ESM = End of Samples Memory
ETE = End of Table Entries
FVSS = First Valid Sample Start
FVTE = First Valid Table Entry
LVTE = Last Valid Table Entry
NASS = Next Available Sample Start
RAS = Result Address for Segment
SS = Sample Start
SSM = Start of Samples Memory
STE = Start of Table Entries
USI = Unique Segment Identifier BR = Bytes Required for next sample
ESM = End of Samples Memory
ETE = End of Table Entries
FVSS = First Valid Sample Start
FVTE = First Valid Table Entry
LVTE = Last Valid Table Entry
NASS = Next Available Sample Start
RAS = Result Address for Segment
SS = Sample Start
SSM = Start of Samples Memory
STE = Start of Table Entries
USI = Unique Segment Identifier

SEQUENCER AND TEST SYSTEM INCLUDING THE SEQUENCER

CROSS REFERENCE TO RELATED APPLICATIONS

This application claims the benefit of U.S. Provisional Patent Application No. 61/094,969, filed Sep. 7, 2008, which is incorporated herein by reference in its entirety.

FIELD OF THE INVENTION

This invention relates to electronic systems and more particularly to a test system including a sequencer.

BACKGROUND

Unlike single function instruments where the firmware is largely static after development, since hardware functionality is predefined and fixed, a multi-purpose test system such as a source measure switching system with plug-in cards that can be removed and inserted in the field does not have this luxury. As new plug-in cards such as switching, signal source, and instrumentation plug-in cards for the platform are developed, inevitably the main firmware of the test system, which can also be referred to as a source measure switching system, will suffer from a lack of awareness and support features for the new plug-in cards that precludes its use without modification.

From a solution standpoint, several options address the issue mentioned above. The simplest option is to mandate firmware upgrades each time a new plug-in card development occurs. While this is the simplest option, it is also the most costly for both the manufacturer and the customer and limits the appeal of the instrument, given the fairly constant need for upgrades to the firmware.

The second option takes classes of general plug-in card descriptors to describe different cards in a reasonably generic manner. Each plug-in card carries a descriptor that the source measure switching system can then read to determine specific properties of the plug-in card. Although this solution offers significantly better adaptability than the first, when a new plug-in card can not fit into one of the existing descriptor classes, a mainframe firmware update would be required in order to describe the functionality of the new class of card. This solution also suffers from the problem that it requires a certain degree of rigidity and conformity, even within a descriptor class, to make the solution viable. This fact effectively limits the ability to create inexpensive hybrid cards that can meet the specific needs of semi-custom, customer-driven applications as an illustrative example.

Test system environments typically require the ability to switch signals from one instrument or instrument to another, be able to measure signals, to source signals, or detect stimulus actions in a high speed and deterministic manner. Given the space premium found in today's testing environments, test applications require test systems that can provide the ability to detect and generate trigger signals for the test system while occupying the least amount of space and provide for maximum flexibility.

BRIEF DESCRIPTION OF THE DRAWINGS

The features of the present invention, which are believed to be novel, are set forth with particularity in the appended claims. The invention may best be understood by reference to the following description, taken in conjunction with the accompanying drawings, in the several figures of which like reference numerals identify like elements, and in which:

DETAILED DESCRIPTION

Figure 1:
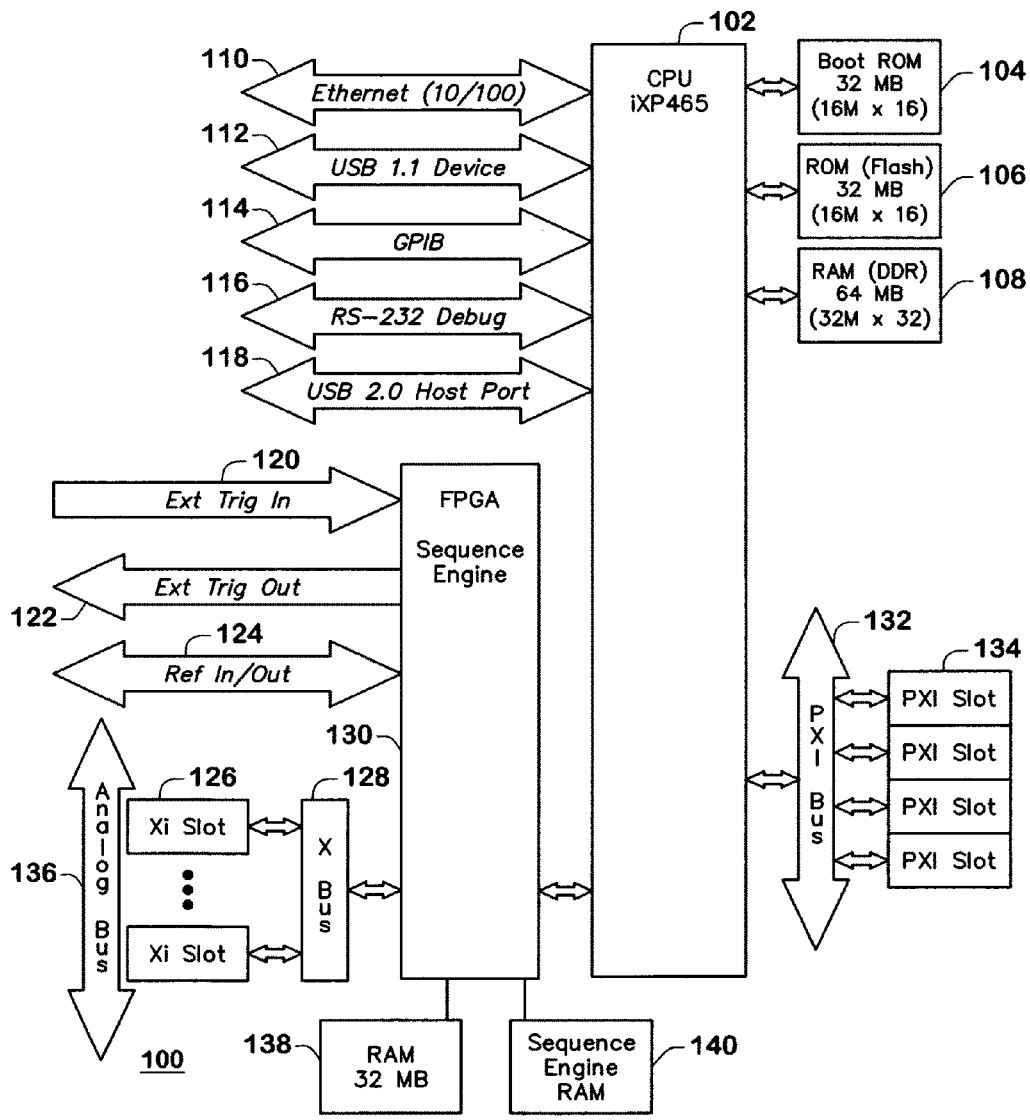
FIG. 1 shows a test system in accordance with an embodiment of the invention.

While the specification concludes with claims defining the features of the invention that are regarded as novel, it is believed that the invention will be better understood from a consideration of the following description in conjunction with the drawing figures.

The present invention provides for a test system including a deterministic sequencer that provides deterministic timing when operating in conjunction with a central processing unit (CPU) as shown in FIG. 1.

Non-Real-Time Operating Systems ("Non-RTOS") such as Linux or Windows allow the use of standardized development tools and environments with the disadvantage of their non-deterministic timing that can be a drawback in test system environments where tight system timing and measurement throughput are important. Alternatively, real-time versions of Linux or Windows are available, but they incur increased development complexity and other tradeoffs.

Referring now to FIG. 1, there is shown a block diagram highlighting a test or source measure switching system 100 in accordance with one embodiment of the invention. Test system 100 includes a controller such as a network processor 102. In one embodiment, the controller comprises an Intel IXP-465 X-scale network processor running a Linux operating system. Other types of high performance controllers as well as other operating systems known in the art can be used for controller 100. A boot Read-Only Memory (ROM) 104 of 64 MB of flash memory loads the operating system from the ROM 106 which holds the Linux OS image. A 64 MB DDR Random Access Memory (RAM) memory 108 holds the OS RAM and also holds measurement samples.

The source measure switching system 100 also includes in one embodiment a 10/100 Base T Ethernet port 110 which can be used for system communications as well as downloading new operating system versions and LXI web pages. A USB 1.1 device port 112 allows for an alternative command port to the Ethernet port 110. An IEEE-488 standard interface or GPIB bus 114 provides a further alternative command port. A RS-232 interface 116 is used for transferring debug messages (Linux console output). A USB 2.0 Host port 118 allows for connection to an external USB storage device to store/recall scan lists and sequences.

An external Trigger In (TRIG IN) input 120 is routed to a sequence engine 130 so that a trigger signal can be routed through a system trigger matrix to other slots, the sequence engine, etc. in the source measure switching system 100. An external Trigger Out (TRIG OUT) output 122 is routed through the trigger router located within the sequence engine 130 in order to provide a variety of trigger options as will be discussed further below. A Reference In/Out (REF IN/OUT) clock router interface 124 allows a reference clock input to be routed among the slots, or allows a clock generated from a plug-in module to be routed to the output. The REF IN/OUT 124 can be programmed as an input or an output. A bus referred herein as the X Bus 128 allows for one or more Xi slot card slots 126 which can accept switching cards or instrument plug-in modules. The X bus in one embodiment comprises a 66 MHz instrument bus to communicate with the Xi cards; the X bus includes data verification and auto-retry. The X bus will be discussed further below. The Xi card slots 126 are also coupled to an analog bus 136. A PXI bus 132 is used as an interface between one or more PXI instrument card slots 134 that can interface/control PXI bus compatible plug-in cards.

In addition to the above, the test system 100 employs a high-speed sequence engine also referred to as a real-time sequencer/scanner 130 capable of making deterministic instrument control operations in approximately ten microsecond intervals, faster times can be achieved with higher speed clocks. Contrast this with a microprocessor running the best RTOS available and the performance is at best deterministic to sub-milliseconds, or a Non-RTOS operating system such as Windows or Linux with a non-deterministic multi-millisecond response. In one embodiment the sequencer or sequence engine 130 is implemented via a field programmable gate array (FPGA).

Unlike a microprocessor which typically lacks time determinism (because of interrupts and processing delays), the sequencer 130 used in the source measure switching system 130 is entirely sequential and deterministic to one-microsecond resolution. It also is fully capable of executing opcode instructions having potentially indefinite completion times and monitoring multiple asynchronous inputs simultaneously without using interrupts—a behavior typically not permissible in ordinary microprocessors. As shown in FIG. 1, sequencer 130 has its own memory 140 for sequence information and data storage. Another memory 138 is also provided for use by the trigger router and other additional functions within the sequencer 130.

In an alternative embodiment, the 130 sequencer can comprise two or more sequencers. For example if two sequencers are present, one is used for immediate command execution and another can be used for deferred use in sequence/scan mode. The two sequencers can be connected to an internal bus arbitrator to prevent contention and also tied to logic necessary for communication over an "X Bus" 128 (described below) interface to one or more installed cards. Additional sequencers beyond two can be utilized for improved system performance, with increased parallel operation and sequence branching. In order to optimize the platform to/for analog, digital, and switching plug in cards, it was necessary to create a new system interface bus which would be optimized for digital control, configurable triggering and interrupts, high speed, fault tolerant, and also include low noise, high-voltage, high-current, and high-bandwidth analog buses. This was accomplished with a new bus design referred to herein as "X-Bus" which includes high-speed low-noise digital communications and both differential and single ended analog buses. The bus structure also includes customizable trigger routing between modules. In addition to the custom bus for specialized instrumentation, the system also includes a standard PXI bus to allow for the inclusion of standard PXI cards.

The control of the plug in card instrumentation requires the application of synchronized and deterministic time-specific commands. This is accomplished in the instrument through sequencer commands and dedicated state machines to control bus communications. The sequencer commands are first defined as high-level functional operations which can then be broken down into lower-level sequential operations which can then be stored and executed in a sequencer to control the modules. Rather than creating a new scripting language for the high-level functional operations, our language will be based upon existing industry standard SCPI commands.

In order to reduce CPU and FPGA sequencer external event detection latencies, an autonomous trigger router system is introduced. The trigger router is a fully configurable trigger input and trigger output routing matrix. In one embodiment, the trigger router allows for 16 trigger inputs, although a different number of inputs can be designed for depending on the particular design at hand. Twelve inputs are from twelve slots. Two inputs are from two Scan Sequencers, and two are from two external trigger inputs located on the rear panel of test system 100. The trigger router can also allow for direct connection between modules in order to achieve minimum latency.

In one embodiment, every trigger input can be configured via 4 detection modes: active high, active low, level high, and level low. Every trigger input can be routed to every trigger output. Every trigger output can be configured for input to output delay, output edge active high or active low, output level high or level low, trigger pulse width, trigger repeat cycles (auto or input triggered), and trigger scan interval timer. The trigger scan interval can be configured for up to 1276 hours. Any trigger output can also be configured to be triggered on single trigger, multiple triggers, or auto trigger if set.

Analog Bus

Test system 100 provides an analog bus 136 including 4 pairs of two-wire analog bus and 8 single-ended analog bus lines. The analog bus 136 allows for multiple DMMs or other instruments to access separate analog buses. The analog bus lines are designated ABUS1 through ABUS4 for the two-wire buses, and SABUS1 through SABUS8 for the single-ended buses. Each analog bus line is relay-configurable. Normally (at power-up), the slots on the left half of the mainframe (5 Xi slots for one version) are separated from the slots on the right half of the mainframe (4 Xi slots for another version). Each bus can span the halves of the mainframe by closing a relay. There are twelve relay channels that are accessible to the user to connect the analog bus lines.

These channels are controlled by selecting module "0", which refers to the mainframe instead of a plug-in module. The channel numbers associated with these are:

| Channel | Connects |
| --- | --- |
| 1 | ABUS1 on slots 1-5 to ABUS1 on slots 6-9 |
| 2 | ABUS2 on slots 1-5 to ABUS2 on slots 6-9 |
| 3 | ABUS3 on slots 1-5 to ABUS3 on slots 6-9 |
| 4 | ABUS4 on slots 1-5 to ABUS4 on slots 6-9 |
| 11 | SABUS1 on slots 1-5 to SABUS1 on slots 6-9 |
| 12 | SABUS2 on slots 1-5 to SABUS2 on slots 6-9 |
| 13 | SABUS3 on slots 1-5 to SABUS3 on slots 6-9 |
| 14 | SABUS4 on slots 1-5 to SABUS4 on slots 6-9 |
| 15 | SABUS5 on slots 1-5 to SABUS5 on slots 6-9 |
| 16 | SABUS6 on slots 1-5 to SABUS6 on slots 6-9 |
| 17 | SABUS7 on slots 1-5 to SABUS7 on slots 6-9 |
| 18 | SABUS8 on slots 1-5 to SABUS8 on slots 6-9 |

So, for example, the command: CLOSE (@0(1:4)) connects all of the two-wire analog bus lines ABUS1 to ABUS4 on slots 1 through 5 to the analog bus lines ABUS1 to ABUS4 on slots 6 through 9. Similarly OPEN (@0(18)) disconnects analog bus line SABUS8 on slots 1 through 5 from the analog bus line SABUS8 on slots 6 through 9. The analog bus does not provide access to the PXI plug-in modules. In one embodiment, separate ground planes for SABUS for slots 1-5 and slots 6-9. If the SABUS from slots 1-5 and slots 6-9 are connected, a relay automatically connects the grounds together. Although this feature is not currently performed using ABUS signals it can be added if desired. Connection to the PXI plug-in modules is accomplished with external cabling. For the plug-in modules which do support connecting to the analog bus, channels 9001 through 9004 shall be used in conjunction with the "[ROUTe:]CLOSe" command to connect to the selected two-wire analog bus lines. Similarly, channels 9011 through 9018 are reserved for connecting the switch card to the single-ended analog bus lines. In order for these channel designations to remain consistent throughout the system, no relay module channel can assign a channel number greater than 8999.

DMM Support

Test system 100 can support up to 4 plug-in PXI DMM in one embodiment. Support levels can be adjusted depending on design requirements. In one embodiment, the DMM model that has been selected for the platform is the Signametrics SMX2064 DMM. This DMM provides up to 7½ digit accuracy.

The following measurement types can be supported in one embodiment of test system 100:

DC Voltage;
AC Voltage;
2-Wire Resistance;
4-Wire Resistance;
6-Wire Resistance;
DC Current;
AC Current;
Capacitance;
Inductance;
Diode Characterization;
Period;
Frequency;
Duty Cycle
Count (Totalize);
Time Interval (pulse width); and
Temperature.

The following stimulus types shall be supported in one embodiment of test system 100 (or designs can includes other stimulus types):

DC Voltage;
AC Voltage; and
Pulse Generator.

Other embodiments of the invention would allow for use of other PXI compatible instruments.

Figure 2:
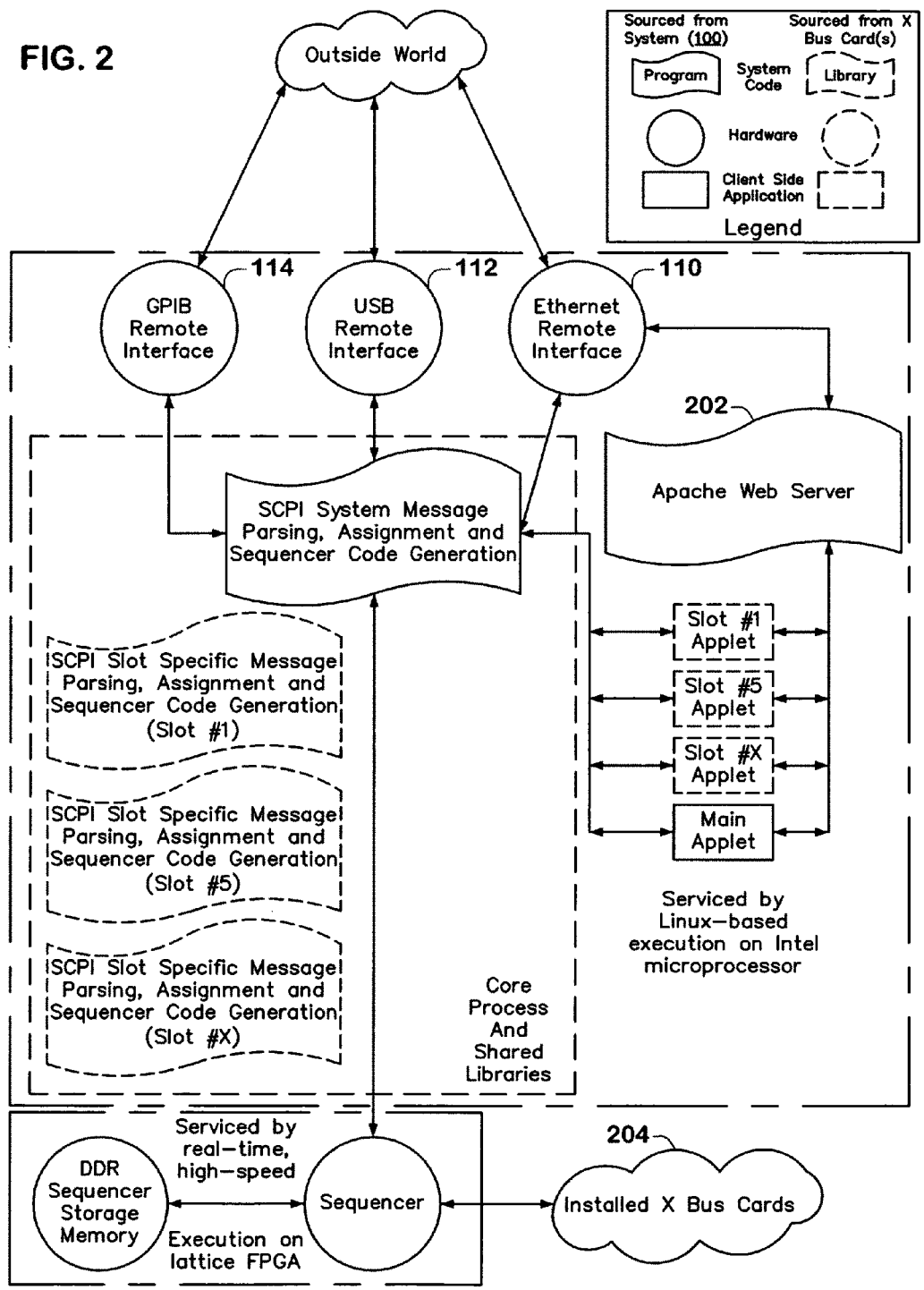
FIG. 2 shows a high level hardware/software model of the test system in accordance with an embodiment of the invention.

In FIG. 2, there is shown a high-level hardware/software model of source measure switching system 100. FIG. 2 shows all the major hardware components in the system responsible for remote communication to the outside world 110, 112, 114, an Apache web-server 202 to facilitate LXI support, the sequencer engine 130, which is the also the communication gateway to all cards 204 present in the system, the single firmware component for the main or core process in the system, and any firmware components sourced by cards present in the system. With this said, the exact features of the proposed software architecture can be broken down further along areas of major functionality.

System Startup and Initialization

Given that the source measure switching system 100 uses a Linux OS in one embodiment, knowing exactly how the system reaches the state described in FIG. 2 proves useful to understanding other architectural components in the system. One of the capabilities of the sequencer 130 and X Bus 128 communication support is an optional feature that allows each card's physical memory space to be accessed in block memory mapped transfers to/from the main CPU memory space. The physical card memory space is not directly accessible from nor is it mapped into the microprocessor's memory space since it is substantially larger than the main CPU supports and is further isolated through the X Bus interface 128. The importance of this feature from a system startup standpoint will become apparent shortly.

Figure 3:
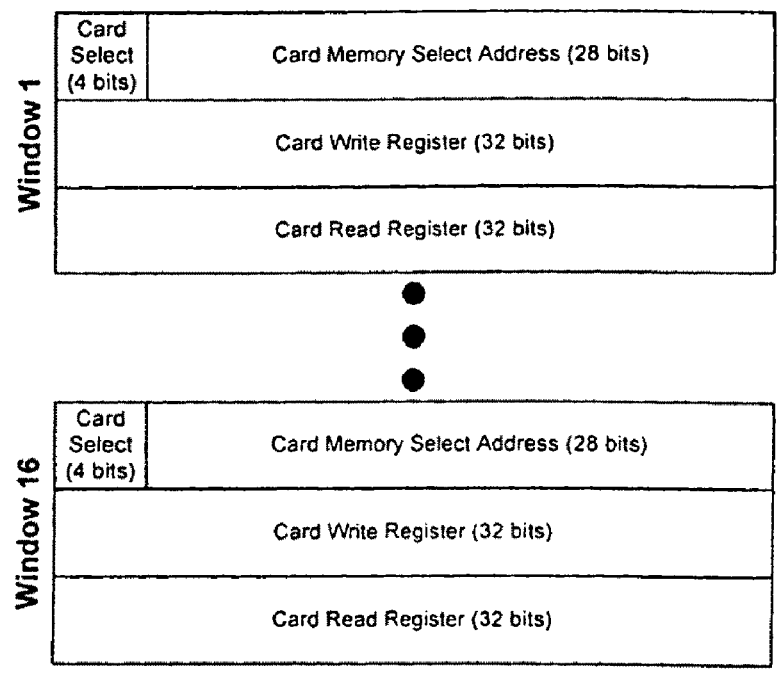
FIG. 3 shows a block diagram of card physical memory access registers in mapped mode.

Prior to describing how startup activities in the source measure switching system 100 use this feature, knowing how it works from a hardware standpoint is critical to deploying it. As shown in FIG. 3, the source measure switching system sequencer FPGA 130 can access the entire 32 bit addressable card memory space for all cards in the embodiment shown. Effectively the sequence engine 130 allocates a physical memory space of $2^{28}$ (268,435,456 bytes) to each card. The upper four bits of the total 32 bit address space determine the desired slot number, 1-12, with slot numbers 13-16 reserved for future use.

Each of the card memory slices allow the core process, at its discretion, to assign dedicated threads to independently service each memory slice without a concern for race conditions. Provided that no other thread inadvertently uses a window not assigned to it, atomicity between operations to the trio of registers within the slice is not necessary. Consequently this allows the software architecture to avoid overheads associated with mutex locking necessary to avoid race conditions that would normally occur in architectures with different threads accessing the same memory space.

The X Bus communication protocol has the ability to pipeline/burst data in block memory-mapped transfer mode for faster transfer times. Once a programmer specifies an address location in the memory select register, the FPGA 130 allows sequential accesses to either the card write or read registers without another update. In fact, it is actually counter-productive to write to the address select register unless necessary since it forces a pipeline/burst reset of the X Bus communication state machine.

Figure 4:
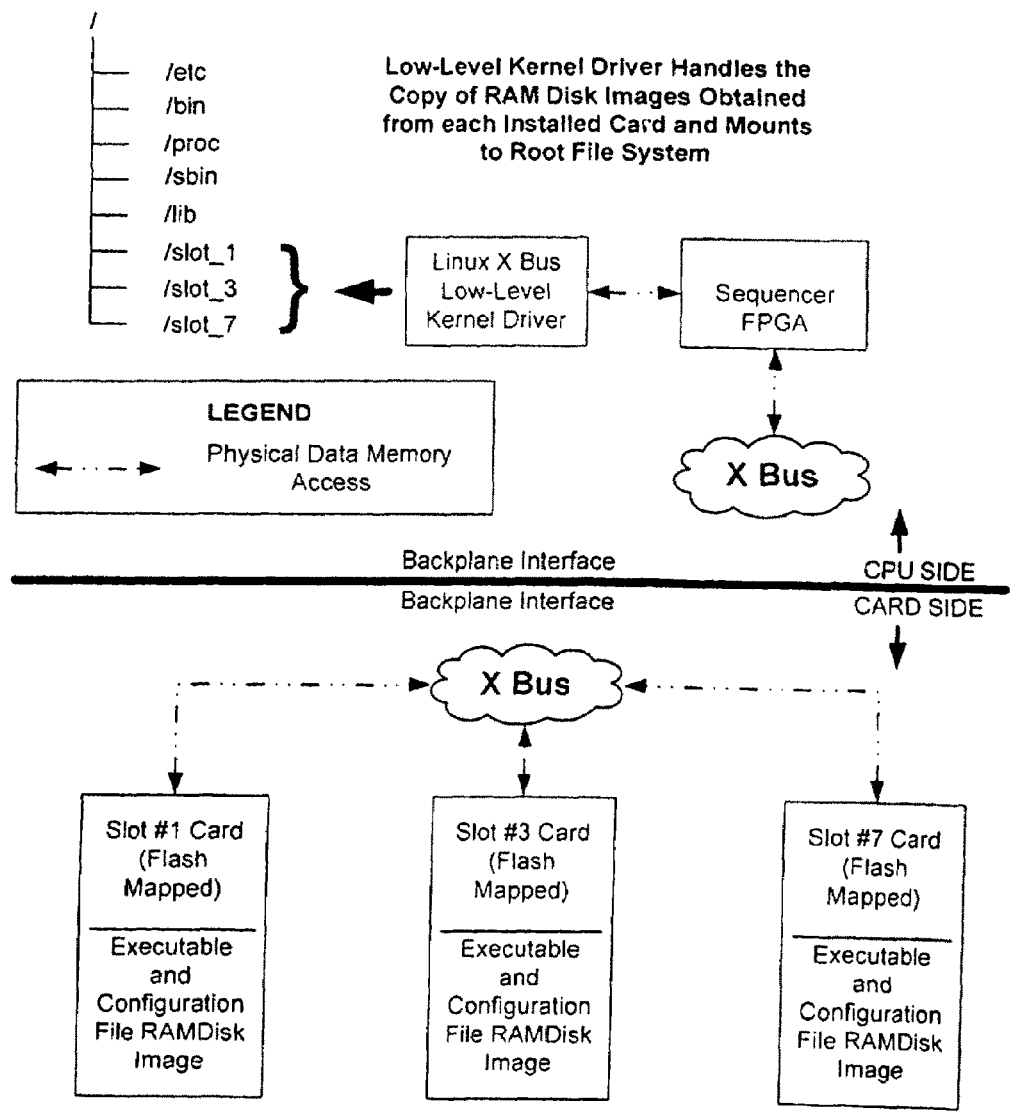
FIG. 4 shows a stage 1 initialization state of the test system in accordance with an alternative embodiment of the invention.

As FIG. 4 highlights, each plug-in card installed in the source measure switching system 100 preferably contains a flash memory device storing a complete image of a Linux ext2 file system. When the Linux kernel starts and completes initial configuration and setup activities, it begins the process of loading installed kernel-level drivers. Obviously, to properly access the X Bus 128, the software architecture for the source measure switching system 100 must provide a driver compiled with the Linux kernel that serves this function. Thus when the kernel first calls the driver, it must do several things:

1) Inspect all slots to determine whether the slot contains a card or is empty.
2) Copy the file system image from detected, installed cards into the main RAM memory of the CPU. The driver performs this activity using the block memory-mapped transfer mode recently described. In another embodiment, the card programs can load from the CPU flash memory.
3) Mount the transferred images as Linux RAM disks to the root file system, prefaced by a top directory indicating the slot from which the image originated. At this point, the contents of each card's flash memory appear as ordinary files.

Figure 5:
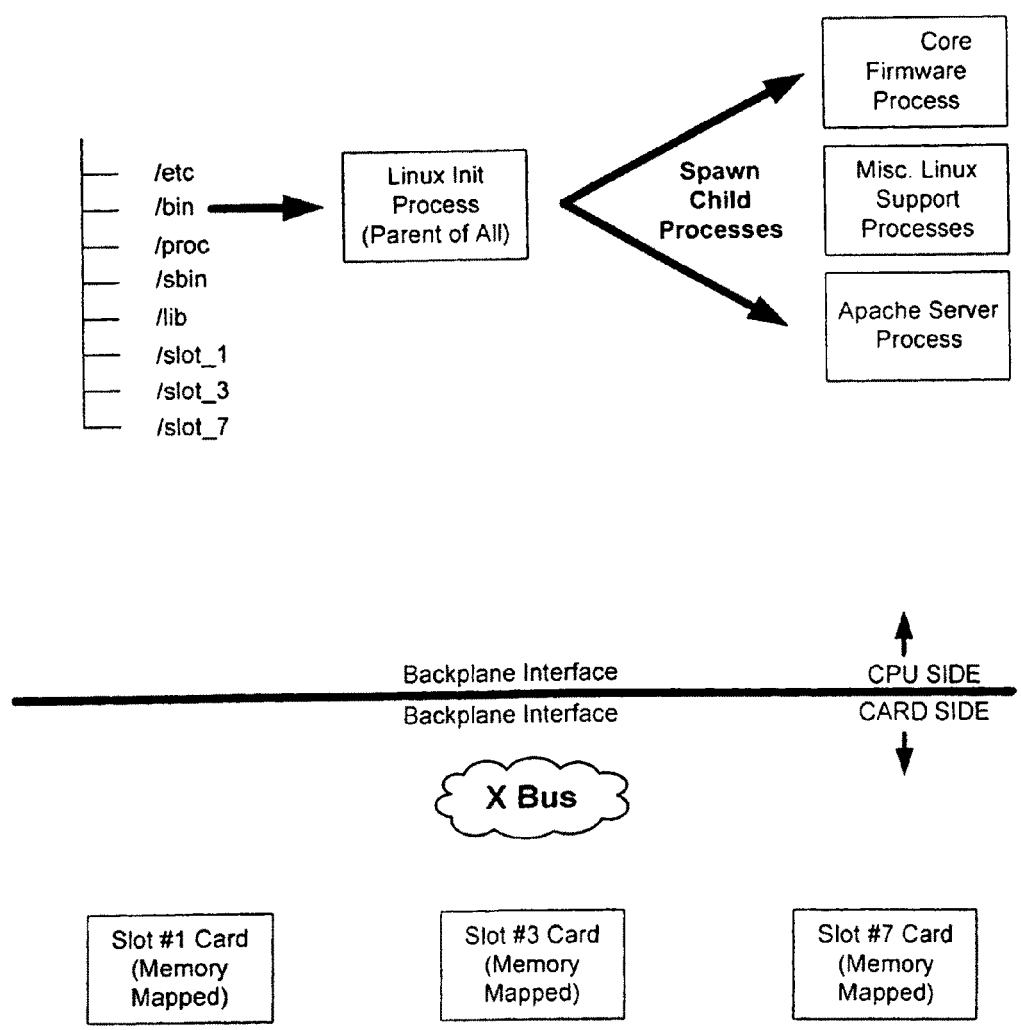
FIG. 5 shows a stage 2 initialization state of the test system in accordance with an embodiment of the invention.
Figure 6:
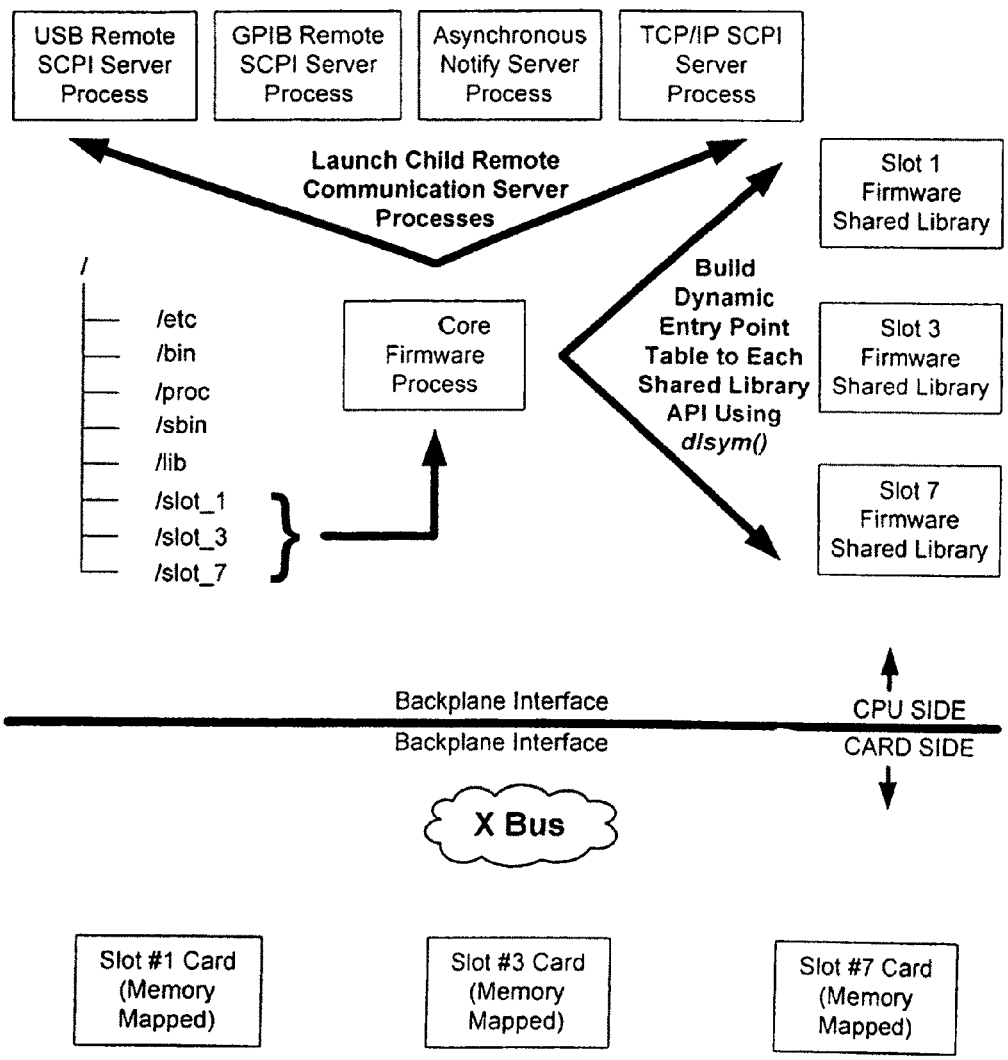
FIG. 6 shows a stage 3 initialization state of the test system in accordance with an embodiment of the invention.

Following this step, the Linux kernel starts the master init process which then in turn starts all other child processes such as the web server, the core source measure switching system firmware, and miscellaneous Linux support processes as FIG. 5 illustrates. When the core process begins execution it internally kicks off additional activities that technically mark the third stage of system initialization. Although the introduction briefly alluded to the fact that the software architecture somehow marries different pieces of firmware sourced by both the mainframe and installed cards, and it didn't elaborate how to accomplish this, FIG. 6 highlights how this is accomplished. With a file system mounted for each card present in the system, the core process need only look into the appropriate directory for the desired slot to locate the shared library firmware specific to that card.

Normally, libraries pose some unique challenges to software architecture planning. For starters, libraries under Linux fall into one of two major classes: static or dynamic. Static libraries are those with the ".a" suffix. This type of library must be re-linked to the main application anytime a change occurs within the library since the entry points for functions within the library are likely to move. The other challenge this library style creates occurs when multiple libraries with identical function names are loaded. This creates ambiguous references for the linker.

Clearly a static library arrangement is therefore not conducive to the source measure switching system architecture. Not only does the embedded environment lack native tool chains capable of re-linking the application to accommodate card libraries at startup, it is entirely possible that identical plug-in cards with identical libraries (and function names) will exist in the system. The second major library class under the Linux environment is dynamic in nature. This most common form today of this type of library is the shared dynamic library. A dynamic shared library typically carries a ".so" file suffix and can be found in the root system library directory.

Unlike static libraries, dynamic shared libraries linked into an application do not get included with the application. Instead the linker makes references to the function names used in an application for which the Linux kernel dynamically determines the execution entry points when the application first starts. While this technique provides a significant improvement over static libraries, it still does not address what happens if an application needs multiple libraries that use a common API interface with identical function names.

Fortunately Linux provides a solution to this problem. Using the Linux dlsym( ) function call, an application that requires support from a particular library can determine a physical function pointer to the library's implementation of a desired function. Hence this erases ambiguity since the running application controls this behavior rather than a context-unaware dynamic linker, as highlighted in FIG. 6. The core architecture builds tables of function pointers at system startup that are referenced later in normal operation. The other key benefit to this technique is that changes or updates to the libraries built outside of the system do not present problems with legacy versions of the core firmware—provided that the basic API does not change.

The core process is also responsible for launching subsidiary child processes that handle remote communications to the outside world. Effectively a dedicated remote communication handling process exists for any major communication pathway into the instrument. Consequently all GPIB communications use the GPIB remote communication process, dynamic web-based accesses use the applet server remote communication process, and so forth.

Figure 7:
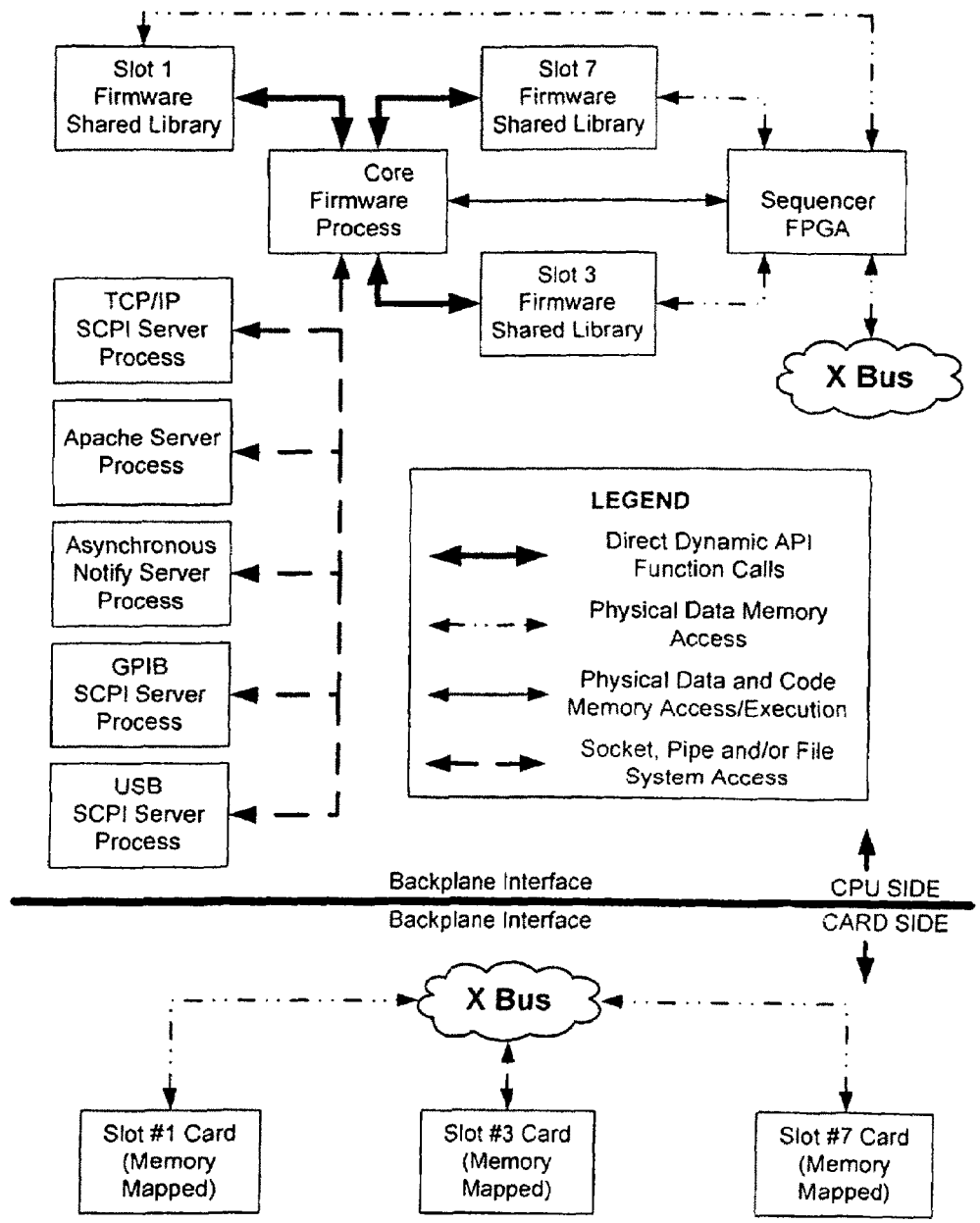
FIG. 7 shows a stage 4 initialization state of the test system in accordance with an embodiment of the invention.

The final stage of initialization for the source measure switching system 100 from a software architecture standpoint is shown in FIG. 7. With connectivity to individual card-specific libraries complete, the core firmware process now establishes sockets/pipes to remote communication servers, begins initialization activities required by user interfaces such as the display, knob, and keypad, and performs card-specific initialization activities. Once these activities are complete, the system is fully functional and ready to accept control input from the outside world.

External SCPI Message Transport

As FIG. 2 shows, SCPI-based communication plays an important role in the source measure switching system's user experience. This is a relatively easy-to-use and well-understood communication standard that many test and measurement companies adopted more than a decade ago for test instrumentation and measurement products.

While the SCPI communication standard lost some favor during the VXI days when hardware interfaces supported direct, high-speed register-based access, it has regained value in ethernet-driven products. Ethernet solutions (for which LXI embraces) are not conducive to direct register-based access. Therefore a SCPI or other message-based communication format must be adopted to facilitate communication. Since SCPI offers hardware interface agnostic behavior that works equally well with ethernet, USB, and GPIB, this time-tested standard has an important place in the source measure switching system's software architecture.

The SCPI standard mandates certain behaviors that drive the implementation of a single master SCPI message processor. Since the standard requires sequential behavior in command execution and proscribes parallel command execution paths, this works to the advantage of a product like the source measure switching system with multiple remote interfaces capable of operating concurrently. From a coding standpoint, implementing state machines based on sequential logic proves much simpler than those that have to account for parallel behavior. Each remote interface therefore only need be served in a first-in, first-out round-robin arrangement.

With a presumption that a single master parser in the core source measure switching system's firmware process shall handle command and query activity, other architecture-specific software details now come into focus. Described earlier and illustrated in FIG. 6, the core firmware process has the responsibility of loading ancillary support processes that act as remote communication servers to the outside world. While FIG. 6 serves a useful purpose in documenting the startup sequence for the source measure switching system, it does not reveal how a remote communication server process should look internally or how it should interact with the core firmware process. To fully appreciate the answer to this question, the software architecture must consider one additional detail.

Full compliance with the SCPI standard implies implementation of the IEEE-488.2 status reporting model. With the requirements established thus far, this software architecture implements a concept where one or more independent "virtual" instrument clients operate an obscured, single "real" instrument. Each virtual instrument in effect is self-contained and implements complete message and error queues, a response buffer, and IEEE-488.2 status registers. For interfaces that support multiple sessions like Ethernet, this approach easily allows each session to act as a virtual instrument also.

One issue results from this approach however. The IEEE-488.2 status reporting standard heralds from the days of GPIB—well before the idea of a single instrument talking to multiple computers and users was even possible. Unfortunately this standard creates some problems when applied to today's technology. The question about the significance of say the "PON" or power-on bit in the extended status register where multiple "virtual" instruments exist becomes grey—since this is technically related to the state of the real instrument and not the virtual instrument. Clearly in the present approach every time a new virtual instrument is opened the PON bit would be set which likely doesn't adhere with the intentions of the standard.

The source measure switching system is fully compliant with IEEE-488.2 status reporting model when the user sticks to using a single virtual client. If the user decides to use more than one virtual client, it is unreasonable to assume the source measure switching system should religiously comply with a standard that is impossible to satisfy because of future technical problems not foreseen when the standard first evolved.

Remote Server to Core 1820 and 1830 Process SCPI Message Transport

The underlying transport mechanism between independent remote communication processes and the core firmware process relies on pipes. In fact, the core firmware process actually establishes two pipes to each remote server process. Because the pipes established in a parent/child fork operation are unnamed, the first step to understanding how messages are passed between processes necessitate a detailed understanding how the pipes need to be established in the first place.

The key detail and benefit of the Linux operating system lies with the fact that idle I/O interfaces block function calls that perform read services until data becomes available. From a program execution standpoint, threading mechanics again become important.

Earlier discussions pointed out that the SCPI standard by its nature is sequential. It also has another characteristic not mentioned yet. Everything that a user sends to a SCPI-based instrument from a message standpoint is solicited. In other words, a SCPI-based instrument will never send an unsolicited message to an external client. This fact therefore guides the architecture of both the master and slave message router state machines handling inter-process communications through these pipes. Describing the internals of these machines is best served by first discussing the master message router state machine found in the remote communication server process.

From the master message router state machine standpoint, it ultimately acts as the "boss" state machine while idle, waiting patiently for the next SCPI message from a virtual instrument client to appear. This relationship changes noticeably after a SCPI message appears. In the wait state, the master message router state machine turns into a "worker" state machine serving at the beck and call of the slave message router state machine. So logically, if the master message router state machine acts as the boss in some cases, and as a worker in others, the relationship for the slave message router state machine would likely behave opposite. The primary mechanism responsible for advancing the slave state machine comes from function callbacks from the master SCPI message processor in the core firmware process. These callbacks in turn drive the master message router state machines in remote communication server processes. The exact mechanism of how callback functions interact with state machines is not easy to see from the figure.

From the standpoint of designing a successful pipe communication protocol, several factors require careful consideration. The first and probably the most important is whether external SCPI messages have the potential for carrying raw binary data or will always be printable ASCII characters. As it turns out, the SCPI message standard generally prescribes a restricted ASCII character set that precludes the use of all binary characters and a number of normal printing characters. The standard does allow, however, for a special, reserved character to signal the beginning of binary data. The source measure switching system will not support this feature since it leads to architectural problems parsing SCPI commands in an abstracted and compartmentalized approach like that used in this system.

With these facts in mind, several binary characters can then be reserved and used internally for inter-process pipe synchronization and communication. Because these characters will have special meaning, each remote SCPI communication server has the responsibility of converting binary characters into a printable "junk" character "" that doesn't have any special SCPI meaning. This insures that both state machines bridging the pipes won't end up in total confusion if one or more reserved binary pipe synchronization characters appear as part of a SCPI message from the outside.

This logically leads the discussion into what characters the pipe protocol reserves. If any process message inserted into an outbound pipe is prefaced with a <STX> character (hex value 0x02) to signify message start, individual data fields signified with the <SOH> character (hex value 0x01), and the <ETX> character (hex value 0x03) to signify end of message, then it follows that the generic form of a inter-process pipe SCPI message would appear as follows:

---

<STX>[message identifier]{<SOH>field 1 data<SOH>...<SOH>field n data}<ETX>
[ ] = required parameters
... = variable number of parameters
{ } = one or more optional parameters that vary by message type
<STX> = reserved message start character
<SOH> = reserved field separation character
<ETX> = reserved message termination character

---

From this syntax and the information assembled earlier in the state and rule tables for both state machines, the actual pipe SCPI protocol concisely summarizes as follows:

External Change Event Notifications in Response to SCPI Messages

The solicited message behavior of the SCPI standard creates one particular problem handling asynchronous notifications to remote applet-based web pages. Since most people expect applet-driven web pages to operate and update in real-time, the only way to accomplish this and still comply with the SCPI standard would have the applets polling the system with a constant stream of solicited status messages. While this certainly works, the technique performs in a grossly inefficient manner, and therefore from a practical standpoint is undesirable.

To effectively address this situation, a mechanism must exist in the source measure switching system to asynchronously generate notifications that one or more cards have changed state. This notification would then allow applets or any remote client for that matter to selectively send SCPI status queries through their respective virtual instrument SCPI client interfaces only when needed. This leads to a significant reduction in message processing and network traffic within and outside the source measure switching system.

1) There are two types of notifications the master SCPI message processor/parser will generate during its activities:
Card State Change—During the process of parsing a SCPI command/query in immediate execution mode, the master SCPI parser takes note of whether the command/query has systemic implications. It also inspects the command/query for associated channel lists directed at one or more cards in the system. From both pieces of information, the parser itself and/or in conjunction with shared libraries from the cards builds sequencer instructions that are loaded and executed. At the conclusion of sequencer execution, the master message processor generates a notification to all listening clients and indicates which slot numbers may have changed. This allows the client to then make a decision whether to query about current state using the standard SCPI virtual instrument client interface.

2) Sequencer Arm/Disarm Change—If a SCPI virtual instrument client issues a command that either arms or disarms the scan sequencer, or the scan sequencer naturally concludes execution, and passes back to the disarmed state automatically, notification consumers will receive indication of this condition. The scan sequencer can operate at speeds that would generate a blizzard of card state notifications running at speed and potentially swamp either the notification clients or the SCPI message queues. Sending an arm notification is a way for the source measure switching system to tell external remote web clients that state information they currently display is no longer guaranteed to be accurate. When a disarm notification is made, all remote web clients need to request updated status information for the cards they represent. The actual mechanics of this state machine are substantially simpler than those used to transport SCPI messages in the virtual instrument clients.

SCPI Message First-Stage Processing and Validation

Although the process of moving SCPI messages from the external world to the inside of the source measure switching system plays a very important role in communication activities, what happens once the messages arrive is equally important. As previous illustrations proved, the master SCPI message processor/parser really becomes the heart of the core firmware process and system. Up to this point, the internal mechanics of the master SCPI message processor/parser has largely been discussed only in general terms. Now that previous subsections have laid the foundation, the discussion can shift towards elaborating on the complex activities that make up this system component.

In prior instrument generations that implemented the SCPI communication standard, the parser entirely resided in the main firmware for the box. While this worked reasonably well, it also suffered certain deficiencies. Since the goal of the software architecture is to compartmentalize and abstract software components to provide for maximum future flexibility, without necessarily requiring updates to the main firmware, several key ideas must stay close at hand:

1) It is entirely possible that a new card will exist at some point in the future with functionality demanding SCPI commands that do not presently exist today. From an architecture standpoint that guarantees proper abstraction and compartmentalization, this implies that the firmware component provided by each installed card must employ a subsidiary SCPI parser. It must be fully capable of determining whether a message is valid and have the capabilities of breaking text into useful commands or queries that will receive further processing by the card-specific firmware. Thus the following summarizes the exact requirements of both the master and subsidiary SCPI message processors:
a. The main process must implement a single master SCPI message processor for the system. All remote communication traffic from any hardware interface must first pass through the master parser. The master parser ultimately must look for command/queries that have systemic implications (i.e. *IDN?, INCLUDE, EXCLUDE, SCAN, etc.) and either act unilaterally or with support from the card firmware depending on the circumstances.

b. The main parser must recognize channel assignments and appropriately break and reformulate smaller message fragments that individual card message processors/parsers can use and process.

c. The main parser must have the capability to recognize a query and reassemble responses generated by individual card-level SCPI message processors if applicable into a single response that the user will see.

d. Card-specific firmware provided by each card must also provide a subsidiary SCPI parser capable of determining message validity for SCPI fragments affecting it, and convert those messages (if valid) into opcode sequences for the benefit of the core firmware process—that if executed on the sequencer—will result in the desired behavior requested by the user's command or query.

2) Since complete abstraction is tantamount to cleanly isolating card-specific firmware from the main instrument firmware, card-specific firmware must not have, nor require, knowledge of other cards that may or may not be present in the system to properly function. This implies that interactions between card-specific subsidiary message processors are prohibited.

3) Given that card-specific firmware is only aware of SCPI message components that directly relate to it, it does not have the proper context to determine when a message should actually execute or not. Therefore card-specific firmware should never execute sequences directly on the sequencer, but instead provide opcode sequences on demand to the core firmware process which then can handle the actual coordination, supervision, and execution of the sequence in the broader system context.

4) While direct sequencer execution in response to a SCPI message received by card-specific firmware is disallowed, card-specific firmware is allowed to access register memory directly provided no execution occurs. This allows scratch memory to be accessed to determine current state that is necessary to satisfy certain types of queries.

Implementing an execution interface with distributed intelligence to promote complete abstraction and compartmentalization also mandates another key requirement. The same command path used to service remote activity to the outside world also must be used to service internal activity as well. The consequences of not doing this are potentially severe. Conceptually, not only do new cards for the source measure switching system 100 have the potential to introduce future SCPI commands that don't presently exist today, but also new modes of display operation for the source measure switching system's man-machine interface. Logically from a software architecture standpoint this implies that the card-specific firmware must be responsible—to some degree—for this activity too. Given that card-specific firmware cannot possibly be aware of systemic implications to other cards, if for example a relay is closed on one particular card, this mandates that activity to these interfaces must first be formulated into a SCPI command and presented to the master SCPI message processor to handle disposition also.

This is a departure from prior generations of instruments where display activity directly called low-level functions to execute changes. This was perfectly acceptable since card-specific contributions of executable code snippets were highly minimal, and where present were carefully coordinated with the main firmware using inflexible and very rigid rule sets. The SCPI standard defines a complete message as one or more SCPI commands/queries separated by semicolons and terminated by a final newline character. Since the remote SCPI communication servers send everything up to and including the newline character it is possible that more than once command/query may be present. Per the SCPI standard, if any of the commands/queries compromising a single message is invalid, or cannot be executed, then the message processor/parser should not execute any of the commands/queries. The first processing step must determine whether the message contains single or multiple command headers.

1) If more than one command header is found in the message, first-stage validation activities must be performed on each command header separately. If a message contains only a single command header, first-stage validation can be skipped since a second validation occurs downstream. The second-stage validation for a single command header or messages with multiple command headers that pass the first-stage validation is identical. For the purposes of illustration, persume the master message processor API function receives the SCPI message "*ESE 255;CLOSE(@2 (1),3(6))\n" where "\n" denotes a newline character. Obviously the message in this situation contains two command headers "*ESE" and "CLOSE". A number of key decisions must be made, the most significant to determine whether "ABC" is a valid command with systemic implications (i.e. activities like include, exclude, path defines, etc.) and if so whether it acts in immediate mode or deferred execution mode. Thus a great deal of value comes from spelling out exactly what types of command/queries exist in the source measure switching system:

A). Non-Systemic Unity: This may be either a SCPI command or query and acts in a card-specific fashion, does not affect adjacent cards or the system mainframe in any way, and is executed in a one-for-one relationship on the sequencer. Typically, the mainframe has no advanced knowledge of what or how this type of command/query works, since it typically is sourced by the card itself. An example that illustrates a non-systemic SCPI command would be "DIG:OUTP" which writes a digital pattern to a specific port on a card with digital capabilities. Most commands of this class type typically execute both in immediate mode or in deferred mode when quoted in a system execution deferral command for scan or program definition purposes.

B). Systemic Expandable: This class is always a SCPI command (never a query). When the user issues an expandable systemic command it may result in the execution of additional hidden commands on the sequencer the user does not directly issue. Classic examples of expandable systemic commands are "OPEN", "CLOSE", and "*RST". For illustration purposes suppose that at some point, the user defines an exclusion list for two relay channels spanning different cards. Assuming one channel is already closed and the user issues a "CLOSE" command to close the other, enforcing the prior exclusion rule requires that the system insert and expand the request into an additional "OPEN" command before executing the user's actual "CLOSE" command. Most commands of this class type typically execute both in immediate mode or in deferred mode when quoted in a system execution deferral command for scan or program definition purposes.

C). Systemic Unity: This may be either a SCPI command or query that has systemic implications and executes in a one-for-one fashion on the sequencer. An example of this class of command would be "WAITTRIG". Most commands/queries belonging to this class typically execute only in deferred mode (i.e. WAITTRIG, GOTO, etc.) when quoted in a system execution deferral command for scan or program definition purposes.

D). Systemic Collapsible: This class type may be either a SCPI command or query and does not directly translate to sequencer opcodes nor require sequencer execution. Most commands/queries belonging to this class typically have context only in immediate mode (i.e. "SYST: ERR?", "*ESE 255", etc.) or only in deferred mode (i.e. LABEL, SET, etc.) when quoted in a system execution deferral command for scan or program definition purposes.

E). Systemic Deferral: This type of command or query itself only executes in immediate mode, however, the proxy command that it represents always executes in deferred mode as either part of a scan list or program instruction. An example of a systemic deferred command is "SEQ:STEP:COMMAND "CLOSE (@6 (18))"". The "SEQ:STEP:COMMAND" command executes immediately but points to a proxy command "CLOSE (@6(18))" intended for program execution at a later time. Other than checks to verify proxy command validity no further action is taken on the proxy command. Systemic deferred commands will always originate from the source measure switching system's core firmware, but not necessarily the proxy commands. Obviously the proxy command can't be another systemic deferral command/query or circular behavior results.

Returning to the earlier hypothetical example of "*ESE 255", once the systemic and execution properties are determined, a number of follow-on activities commence depending on this outcome. Once "*ESE 255" is classified as a systemic command, the next question is whether it requires a channel list. In this case it doesn't but if it did and does not have one instantiated, the entire message is invalid, a SCPI error message must be queued, and processing for the remainder of the message terminates.

If the presumption that "*ESE 255" successfully validates, the message processor must then look to see if any further command headers exist in the message. In the hypothetical example offered, the message processor would then find the command header "CLOSE". This command would obviously classify as a systemic command (since exclusion and inclusion lists may affect one or more cards). A non-systemic command must always have a channel list specified to help direct the message fragments. If this is not the case, the command must be invalid and a SCPI syntax error message queued. System commands, however, may or may not require an associated channel list. In the case of "CLOSE" a channel list is most certainly required.

With careful inspection, the diagram reveals that once the message processor encounters a channel list, it must "fragment" the channel message into separate, discrete messages directed at a particular card. The message "CLOSE(@2(1),3 (6))" becomes two separate messages: "CLOSE(@2(1))" intended for slot number two and "CLOSE(@3(6))" intended for slot number three. During the process of generating these message fragments, the slots that will receive the fragments also become known. Provided that slot number two and slot number three in the hypothetical example actually contain valid cards, the master processor will know this immediately but still will not know whether "CLOSE" actually has meaning to the cards.

To determine whether one or more cards recognize a command, the master message processor then turns to the function entry point table for the shared libraries and locates the API execution entry points to slot_SCPI_message_validate( ) for each card. Because commands do not always have valid context in different execution modes, the standardized API call expects a pointer to the message fragment along with the second boolean parameter of TRUE or FALSE, to indicate whether the command is intended for immediate execution. Additional parsing/processing activities occur within these card-specific function calls in a very similar fashion to those already described for the system-level message processing. A call to the validation function for each card therefore returns a simple TRUE or FALSE value to indicate whether its particular message fragment is valid or not.

If any validation exercise fails on a message fragment, the master message processor does not need to continue processing additional fragments after the first error is encountered. The master message processor does have an obligation, however, to discover the underlying reason why a fragment failed. To this end, every shared library provided by each card present in the source measure switching system implements a standard API function: slot_SCPI_message_error( ) This function provides both a numeric and text-based error messages accounting for the exact cause of any validation failure. Like other shared library API calls, the function entry point is easily determined from the shared library function entry point table generated at system initialization.

SCPI Message Second-Stage Validation and Execution

First-stage validation activities are only necessary with messages containing multiple command headers since first-stage and second-stage validation are identical in the case of single command header messages. On reaching the second-stage validation, and provided it confirms the validity of the pending command/query, some additional decisions must be made. As the figure illustrates, one possibility is that the command is systemic deferral command like "SEQ:STEP: COMMAND". In this situation, the command need only be appended to the appropriate user program stored in main CPU memory. The other possibility is that the command execution activities, all further message processing actions flow into a decision tree and each command added to the expansion list is then re-validated.

Using the hypothetical example "ABC;XYZ(@2(1),3 (6))", The master message processor begins the execution phase by stripping the first command "ABC" from the expansion list. Stepping through the decision tree, the first step of command execution performs any non-sequencer system-related activities particular to some commands. Not all system commands required this step, but any real-life command like "*ESR?" and "SYST:KLOCK" that act in a purely record-keeping capacity and do not require sequencer support will perform those housekeeping tasks here. For illustration purposes, the hypothetical "ABC" command may be presumed to be of this type. Hence after performing housekeeping, the decision tree reveals that if the command only affects the system and no code segments exists, command execution is complete in immediate mode.

The next command the expansion lists contains is "XYZ (@2(1),3(6))". For now presume that "XYZ" is found to be a non-system command and therefore the master message processor has no system opcode contribution to make. The command does however contain a channel list and therefore affects more than the system. The master message processor farms out the message fragments "XYZ(@2(1))" and "XYZ (@3(6))" to the respective shared libraries for slot number two and three by calling the standard API generate_opcode_ segment_table( ) interface for each shared library with the appropriate message fragment. Since the master message processor has no clue what "XYZ" actually does or how to effect the execution, these API calls provide the answers.

Carefully note that calls to this particular API interface function returns a 32-bit unsigned integer that when cast into address pointers refer to an opcode "segment" table. The word "segment" defines the key aspects of the opcode generation process. The source measure switching system in the long run will encounter a broad cross-section of cards with very divergent handling requirements. At one extreme, a digital card typically changes state in a microsecond timeframe. At the other end of the spectrum, an optical card with motor-driven prisms changes state in a timeframe that typically spans multiple seconds. These are very different timeframes and yet a source measure switching system must properly handle state change requests seamlessly and in an efficient manner.

To further expound on the last point, presume for a moment that all twelve slots in an example source measure switching system actually contain very slow optical cards. Also, presume that the hypothetical example SCPI command "XYZ" requires each optical card to undertake a number of complex, sequential steps to complete in a total timeframe of 10 seconds. With those assumptions in place it is worthy to study two different execution techniques and make a choice based solely on performance.

One perfectly legitimate technique the master message processor could choose to use takes the opcodes from the first card, executes them from beginning to end, and then repeats the same activity for the second card (a serial approach). A problem results from this approach, however. Since each hypothetical optical card takes ten seconds to perform all the steps that make up the command "XYZ", imagine for a moment what would happen if the overall SCPI command referenced all 12 slots in a source measure switching system simultaneously. This would result in a total command execution time of two minutes. Most users would find this delay annoying at the least and more likely unacceptable. So while this technique takes the least amount of effort to implement, it lacks viability.

The alternate approach uses a scheme that breaks operations into sequences of opcodes, which are step driven—henceforth referred to as "segments". If these segments from all cards are interleaved and executed in aggregate within the source measure switching system's sequencer, the command "XYZ" that affects 12 optical cards now only takes 10 seconds to complete instead of two minutes. This truth results from the fact that the execution of the command across all cards acts in parallel instead of sequentially.

On its face, this approach to parallel execution might seem to violate the spirit of the SCPI communication standard. This is not the case, however. While the standard specifies that individual commands separated by either a newline character or semicolon must be performed sequentially, it does not preclude parallel execution within the same command. Clearly this technique therefore offers superior performance and therefore makes the most sense for the source measure switching system. To better illustrate a practical implementation of the proposed opcode segmentation technique, presume that the card located in slot number two is a hypothetical optical card that the command "XYZ" moves a prism from a first position to another position in a four-step process as follows:

1. Unlock rotor brake mechanism of actuation motor.
2. Wait for minimum required brake release time of 100 µs and initiate motor movement to new position.
3. Wait for minimum 40 ms hold-off and then begin testing movement completion flag.
4. Wait 40 ms after completion flag signals completion for motor to settle and then reapply rotor brake mechanism.

Figure 9:
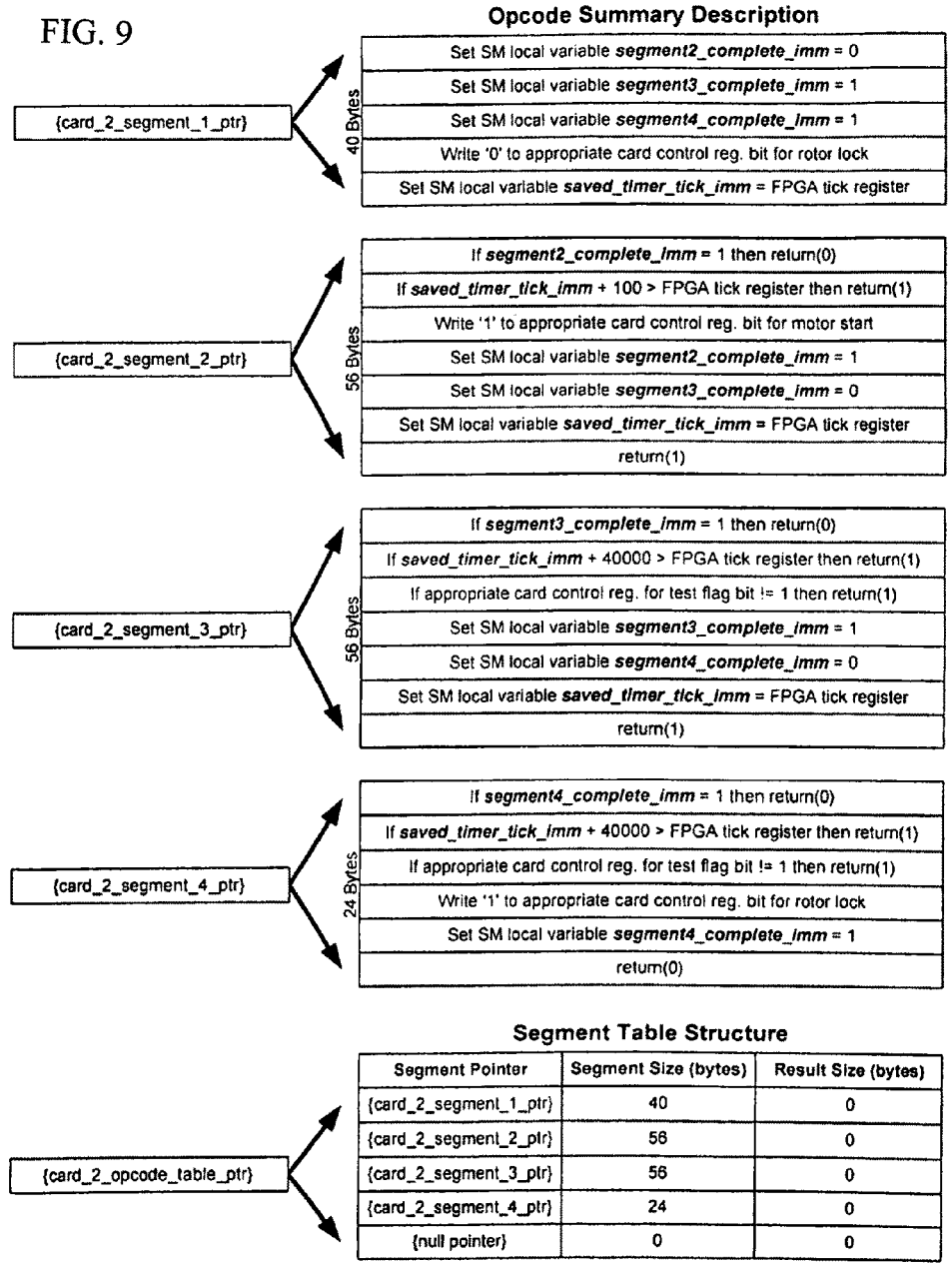
FIG. 9 shows an opcode segment and segment table in accordance with an embodiment of the invention.

The trick to successfully execute opcodes spanning different cards in an interleaved, parallel fashion, requires each segment to time their delays in a non-blocking, relative fashion. Fortunately the sequencer or sequence engine 130 provides an easy way to do this by simply monitoring the microsecond tick register within its FPGA. FIG. 9 illustrates, in a descriptive format as opposed to using actual sequencer opcodes, how the hypothetical optical card occupying the second slot in the example the source measure switching system accomplishes this feat for the command "XYZ(@2 (1))" intended for execution on the immediate sequencer.

Breaking this particular illustration down further, the first segment initializes a number of local state tracking registers referred to as segment2_complete_imm, segment3_complete_imm, and segment4_complete_imm. These registers are effectively allocated sequencer scratch memory "SM" that every shared library may request from the core firmware for internal use. In this case, these three registers indicate whether a given segment should execute: a value of '0' indicating the segment should execute and a value of '1' meaning it should not. After setting up these state-tracking registers, the opcode sequence in the segment writes a value into the appropriate control register to release the rotor brake and then grabs the current timer tick register to calculate the proper wait period.

FIG. 9 points out another important structural feature of segment definitions. Notice that the first opcode segment appears in non-subroutine form while all subsequent segments are framed as subroutines. This distinction allows cards with very simple, but extremely fast requirements to build the first segment in a form that the master message processor can load in the sequencer as in-line code without incurring subroutine overhead penalties.

Note that in subsequent segments, the state tracking registers mentioned previously now take form and specifically determine whether the contents of a subroutine should execute. The master message processor will interleave all subsequent segments into an indefinite execution loop that only exits when all segments return a value of '0', meaning no further activity is required. Hence in the second segment opcodes for this example optical card, the sequencer is comparing the present tick register against the saved value plus 100 µs. If the proper delay has not yet been reached, the segment returns with a value of '1' telling the execution loop that this segment is not yet complete. Since segments three and four cannot execute until segment two completes, the state tracking variables for these segments have values of '1'.

When enough delay occurs to satisfy the minimum 100 µs requirement, the control register controlling the motor enable is activated, the state tracking register for segment two changed to do not execute '1' and segment three changed to execute '0'. Clearly, the next pass through the loop the second segment no longer executes and now the third segment is active. This process continues all the way through the fourth and final segment. The key difference is that once completed, the call returns zero since all segments are for the card are fully executed and complete.

In theory, any shared library can implement an unlimited number of opcode segments to execute any given command. The unsigned integer value returned by the API interface function call generate_opcode_segment_table( ) mentioned earlier points to the start of a segment table whose structure is shown at the bottom of FIG. 9. As the figure reveals, this segment table stores additional pointers to individual segments and maintains the sizes of each segment. Note the table entries terminate with a null pointer to signify the end of the table.

In addition to telling the main message processor the size of each opcode segment, each table also tells the main message processor how much space (if any) each segment will require to store intermediate query results in sequencer memory when executed. Obviously this is only important for SCPI query commands (i.e. XYZ?) that actually store a sample or result. Since the command in the hypothetical example acts in a non-query capacity, the result or sample storage requirement is zero for all segments and appears as such in the illustration. For the purposes of completing the overall example, presume the third slot contains a card with a much simpler physical topology hosting a number of NO/NC electro-mechanical relays and only requires two steps to effect the command "XYZ(@3(6))":

1. Write bit to relay control register.
2. Wait minimum 50 ms time interval to guarantee contact settle time is satisfied.

Figure 10:
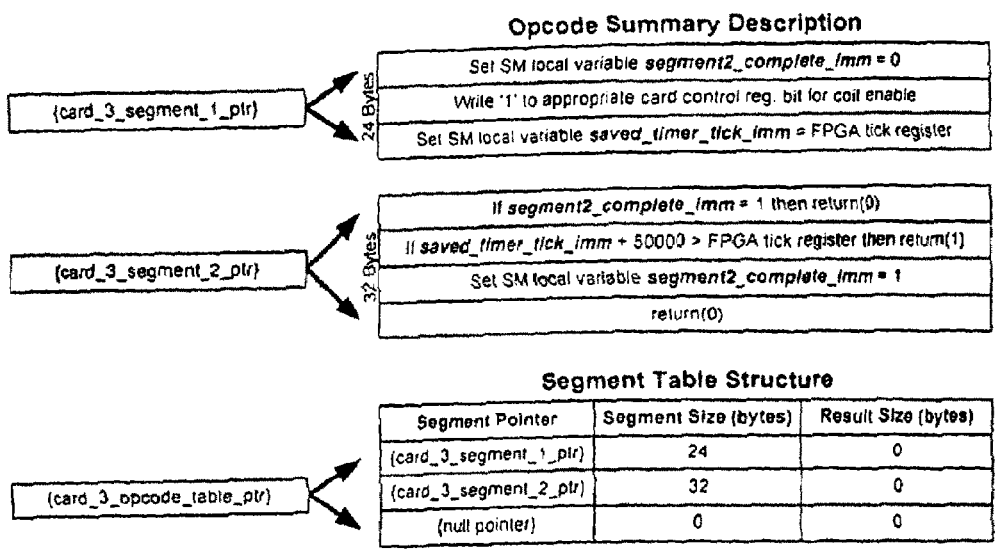
FIG. 10 shows a block highlighting opcode segments and segment table in accordance with an embodiment of the invention.

FIG. 10 illustrates a similar immediate sequencer opcode segment implementation for the much simpler hypothetical switch card located in the third slot. This illustration shows the two steps necessary to implement the SCPI command "XYZ" for this slot. The key to tying these segments together in a useful manner, leads the discussion into the area of what the master message processor does with the segment tables it either produces for itself and/or obtains from individual card-specific shared libraries. The explanation of parallel execution earlier left a subtle hint about overall sequencer memory organization with the use of terms like "interleaved" and "aggregated".

Figure 11:
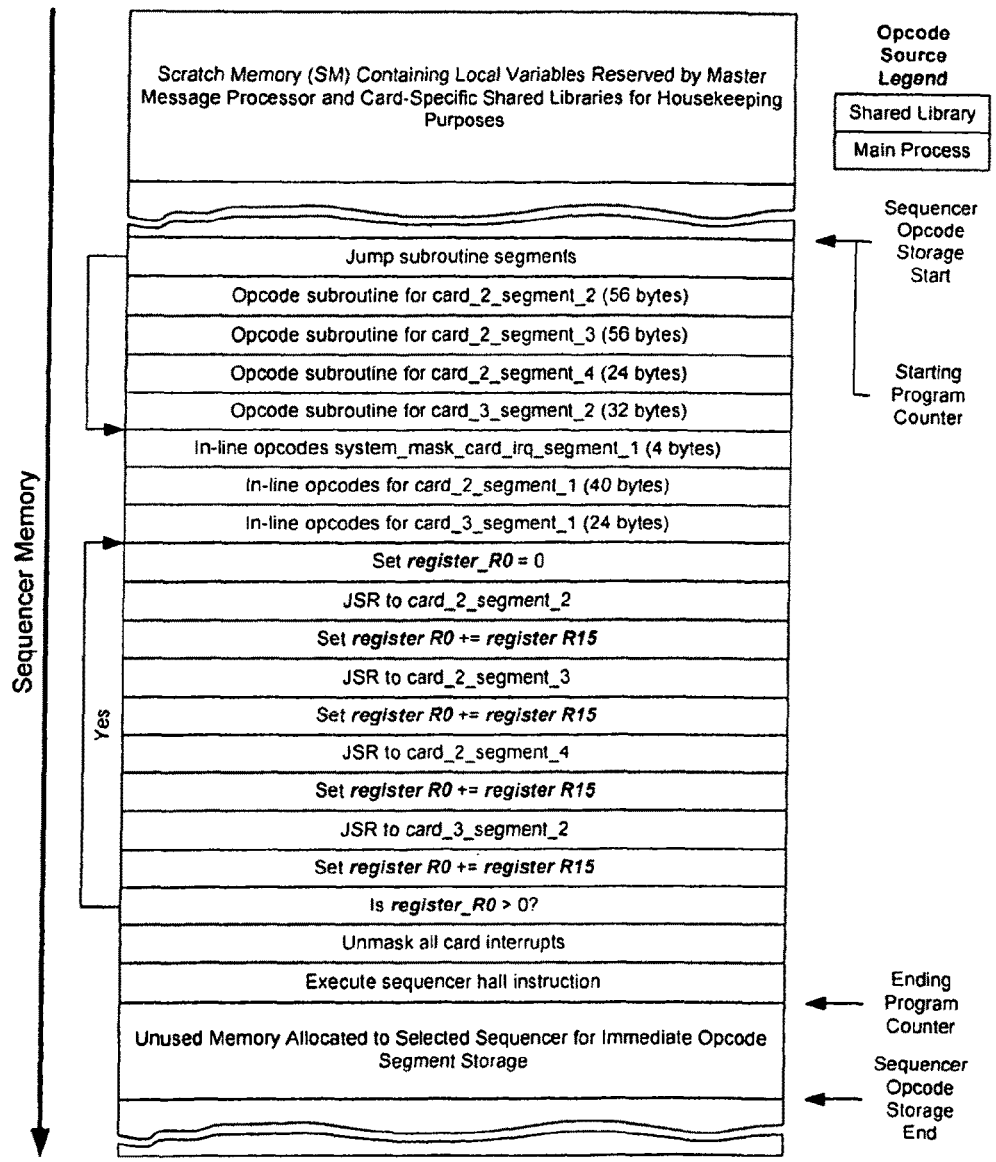
FIG. 11 shows a non-query sequencer segment interleaving in accordance with an embodiment of the invention.

Because the message "XYZ(@2(1),3(6))" is a non-query, and won't require any intermediate result, or sample storage during sequencer execution, the process of loading/assembly takes the form shown in FIG. 11 and shows how the contributions from the system and individual cards are bundled. Focusing on the details shown in FIG. 11 further, carefully note that the master message processor takes non-starting segments (if any) that are written in subroutine form and simply places them sequentially at a location in sequencer memory of its choosing. Once the subroutine-based segments are copied into sequencer memory, the sequencer program counter is set to the very next location. The master message processor then continues by loading all starting in-line segments sequentially from this point forward.

Once all in-line segments are in place, and presuming that non-starting segments exist, the master message processor loads a "glue" instruction to set the scratch memory variable loop_again_imm to zero. The main message processor assigns a location in scratch memory to this local variable for the purposes of determining whether a pass through any subroutine-based segments is necessary. Since both sequencers (immediate and deferred) may operate simultaneously, the master message processor must operate on the appropriate loop_again_imm local variable depending on the selected target sequencer.

At this point, the master message processor generates additional glue subroutine calls to each one of the non-starting segments loaded in the very beginning. The master message processor also must insert glue instructions following each jump to subroutine instruction to capture the return value of the respective subroutine (sequencer register R15) and add it to the loop_again_imm local variable.

Finally when all subroutine references and return value capture instructions are in place, the master message processor inserts a test instruction. If the loop_again_imm variable is not zero, a glue test and jump instruction sends program execution back to the point where the local variable is initialized to zero and the cycle starts again. If the test concludes the variable is zero, the master message processor lays down a final sequencer halt instruction to mark the program's termination point.

The master message processor inserts an instruction to block card-level interrupts prior to running the first segment and a second instruction to unblock them at execution conclusion of the remaining interleaved segments. Intuition would suggest this to be a bad idea since card-level interrupts usually signal the detection of a relay switch card safety shutdown signal (emergency card reset) or an outright fatal card failure. Allowing card-level interrupts to pass back to the sequencer uncontrolled poses a much worse problem, however.

To illustrate why this is the case a single SCPI command often spans more than a single card, the exact situation in the present example. Suppose that respective first segments from all involved cards make state changes and the final tailing segments perform the record-keeping activities. Once the sequencer 130 detects a card-level interrupt, it has an obligation to halt and notify the CPU 102. If a single card fails while executing a segment in the middle and interrupts are left unmasked, the sequencer would halt and leave record-keeping in disarray for more than just the faulted card. In the end, with no way to recover from potentially corrupted state information, the master message processor under this scenario would have to take down not only the faulted card but also any other cards participating in the command.

What happens if the external environment asserts a safety shutdown signal into a card and interrupts are currently masked? By definition, these shutdown signals, result in the desired hardware changes autonomously of the sequencer 130. Therefore even though the sequencer 130 may be blissfully writing contrary instructions found in particular segments of cards held in reset, they have no ability to override hardware protection and are simply ignored by the card. Hence once the command completes and the sequencer 130 hits the instruction to re-enable card-level interrupts, the sequencer 130 will halt in a safe location for the remaining unaffected cards. The master message processor running in the CPU 102 will then see that a reset occurred and be able to set affected cards back to a known reset state from a software standpoint.

A similar, but different situation occurs if a card completely fails and loses communication with the mainframe. In this case, the interrupt-masked sequencer may continue to write and read from memory on the failed card no longer present. Fortunately the X Bus interface 128 recognizes a dead card. Any write operation from the sequencer 130 directed at the dead card will simply be ignored while a read operation will return a zero value. Once the interrupts are unmasked at a safe location, the sequencer 130 will fault, and the master message processor will then take the faulted card down from a system standpoint without needing to worry about corruption on unaffected cards. Clearly any data substitutions made by the X Bus interface 128 won't matter since the problem card will be shutdown.

Once sequencer memory resembles that shown in FIG. 11, the aggregated and interleaved segments are ready for execution. If the selected sequencer is immediate (as it is in this hypothetical case) the master message processor starts the sequencer and allows execution to commence. Once the sequencer 130 halts and notifies the CPU 102, the entire hypothetical command "ABC;XYZ(@2(1),3(6))" now stands executed.

Moving to a more complex example utilizing SCPI queries, presume the source measure switching system 100 contains two additional identical signal measurement cards in the first and fourth slots. These cards allow the user to obtain readings using a SCPI "JKL?" query command. With this assumption in mind, the user sends the command "JKL?(@1, 4)".

After the validation process confirms that both cards recognize this command, the master message processor then requests opcode segment tables. The hypothetical segments and segment table for use on the immediate execution sequencer appear in FIG. 12. Note that two segments are needed to perform the hypothetical "JKL?" query. The first initiates the measurement and reads the auto gain selection register to find out what gain range the analog-to-digital converter selected. Collecting this range setting will be necessary for post-sequencer result processing and response formatting. After a minimum one millisecond delay timed in the second segment, the sequencer 130 then executes a read operation against the converter to collect the reading.

A key difference becomes apparent between a SCPI command and SCPI query. In the case of a SCPI query embedded in a scan list or sequence, the user may ultimately want to test the result for an alarm condition immediately following the measurement. Consequently, the final opcode segment of every query must by convention load the sequencer's R8 register with its alarm status. This alarm status reports one of three possible conditions: 0=no alarm, 1=low alarm and 2=high alarm. If a particular card does not support alarm conditions, the final segment shall always set the sequencer's R8 register to zero (the no alarm condition). For the present example, the hypothetical cards in the first and fourth slots do not support this feature and therefore default the value to zero as prescribed.

One of the most significant differences, however, rests in the fact that a query collects data in one more segments and must have a reliable method to store and recover data for post-sequencer processing. Clearly a system that does not support data collection would be of little use to most end-users. To this end, the sequencer(s) 130 must satisfy real-time result capture requirements without CPU interaction, handle varying result memory sizes, and manage buffer rollover in the case of the deferred execution sequencer.

The exact technique the source measure switching system 100 uses for data collection therefore requires further elaboration. By convention every segment uses the sequencer's R9 register as the pointer to the next available result memory location. Since sequencer 130 registers greater than R7 are neither pushed nor popped, these registers will safely retain the correct value in or outside subroutines. When a data segment needs to store a result, it simply stores the data in long-word multiples indirect at the location indicated by register R9 and increments the pointer appropriately at the conclusion of the storage operation. Careful inspection of FIG. 11 confirms that both hypothetical cards in the present example follow this process.

With both segments defined for the present example, the discussion can shift to how the master message processor interleaves, and organizes sequencer memory for query operations. The answer to this question depends on whether the sequencer 130 acts on behalf of the immediate or deferred execution modes. In the case of the immediate execution, the master message processor never needs to incorporate alarm condition testing as a distinct step in the sequence unlike deferred execution where this may be a possibility. In immediate execution after the sequencer halts, the master message processor reads the R8 register and takes appropriate action.

Before building query opcode sequences, and assembling them in sequencer memory, the master message processor must insure however that any data storage requirements from system or card-based segments will fit within the present user allocation of immediate result memory first. It can easily make this determination by summing the individual segment result memory sizes indicated in the segment tables and insuring that the total does not exceed the allocation allowed by the user. If a single command requires more result storage then is presently allocated, the master message processor must queue a SCPI error and terminate further message processing for the command. Failure to take this action would cause the result buffer to overrun during execution and potentially lead to a very bad system outcome.

Figure 13:
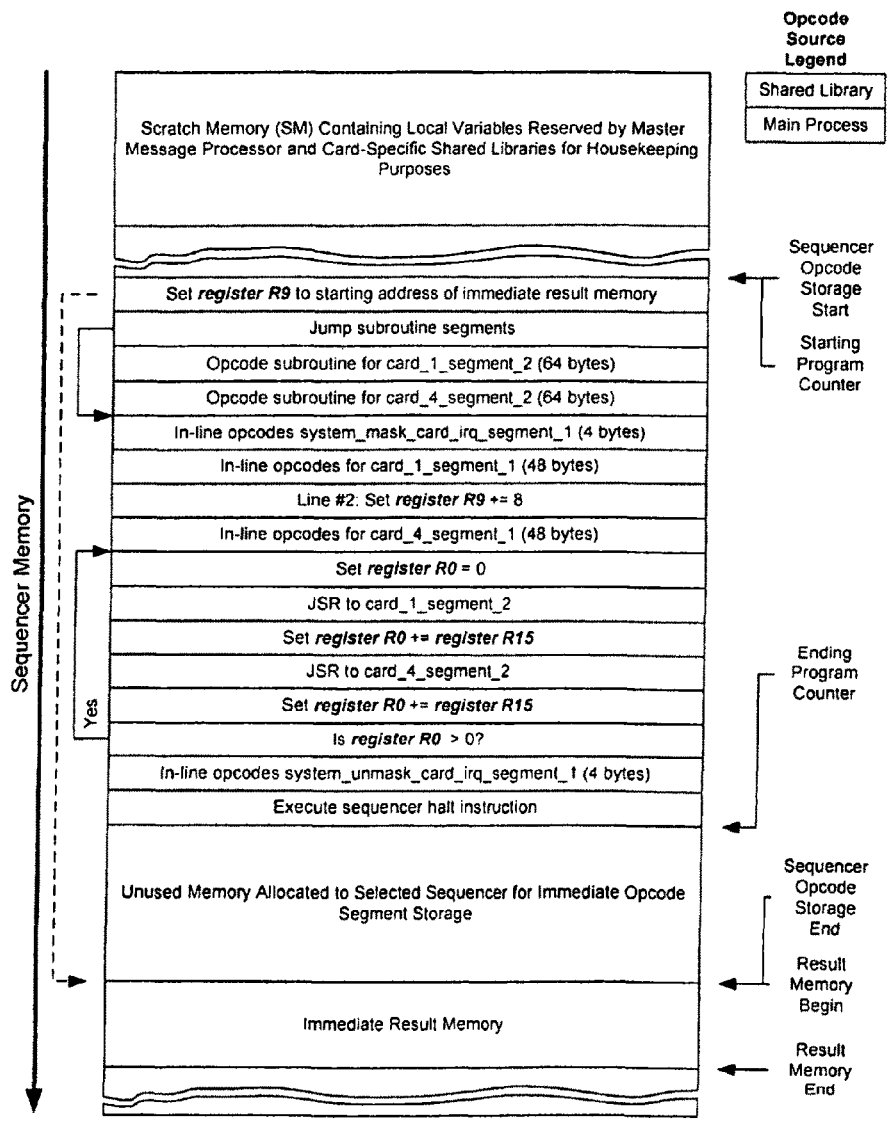
FIG. 13 shows a diagram of a query sequencer segment interleaving in accordance with an embodiment of the invention.

With this pre-qualification properly made, the master message processor interleaves and assembles segments intended for immediate sequencer execution in the manner shown in FIG. 13. Drawing some comparisons between FIG. 13 and FIG. 11 will prove useful. As was true in the earlier case, the master message processor loads non-starting, subroutine-based segments at the beginning of opcode sequencer memory and sets the starting program counter to the first location following the subroutines. The first noticeable difference with queries is that the master message processor inserts a "glue" instruction to set register R9 to the starting location of immediate result sequencer memory.

Since multiple segments from different sources rely on result memory in the present example, the master message processor needs to make sure that each source stores its results in known spots relative to the starting location. It does this by inspecting segment tables to determine memory offsets. In the case of the first card, the segment table indicates a requirement for four bytes in each of two segments for a sum total of eight. Using a scratch memory local variable card_1_R9_imm, the message processor saves the starting value of immediate result memory. For the other measurement card its data will therefore need to be offset by eight bytes. Hence the master message processor employs another scratch memory local variable card_4_R9_imm to track the current result memory address for this card.

Next, since register R9 reflects the correct result memory address for the first card, the master message processor lays down the opcodes for the first or in-line segment of this card. Unlike the non-query case, however, the master message processor can't just lay down the next card's in-line segment. Instead it must insert "glue" instructions to capture register R9 and store it back into the local variable card_1_R9_imm followed with an instruction to set register R9 to reflect the current result memory address card_4_R9_imm for the next pending segment. Once the message processor has the proper glue instructions in place, it lays down the in-line segment for the other card.

As a close inspection between FIGS. 11 and 13 indicates, the process of interleaving non-starting segments is virtually identical in both cases with a single difference. In the case of a non-query, the master message processor simply inserts the subroutine calls in the execution loop in a back-to-back fashion. For queries, however, it has to properly load and unload register R9 from the appropriate local variables that track result memory. The master message processor inserts supporting glue instructions anytime the next segment subroutine source to execute is different than the last.

In the case of the present example where each card only has one subroutine-based segment, the housekeeping appears after every segment. Although this example doesn't illustrate it, the master message processor knows in advance whether any segments will store data or not by inspecting the appropriate segment table. At its discretion, the master message processor may optimize out housekeeping activities for segments that will not collect data. Once the sequencer 130 reflects the state shown in FIG. 13 the master message processor starts the sequencer and waits for a completion notification from the immediate sequencer.

Although the method for extracting results after sequencer execution and converting/formatting them into useful information is important, for continuity purposes this discussion shall be deferred to receive a more thorough treatment later. Instead, the discussion will now focus next on the organization and structure of sequencer memory for deferred command execution.

Unlike immediate execution mode, where the master message processor can easily detect and prevent buffer overrun conditions prior to execution, this luxury does not exist for more complex operations on the deferred sequencer. Users may define a scan or sequence list that recourses through a query an indeterminate number of times depending on conditions or external trigger events. To adequately provide a basis for understanding the exact mechanism the source measure switching system 100 uses to handle this problem and also show how alarm conditions may be part of execution decisions, another example will be required.

Therefore the premise of the next hypothetical example will revolve around a simple sequence definition transmitted to the source measure switching system through one of the communication interfaces by the user:

SEQUENCE:STEP:CONTROL "LABEL START"
SEQUENCE:STEP:CONTROL "WAITTRIG"
SEQUENCE:STEP:COMMAND "JKL?(@1,4)"
SEQUENCE:STEP:CONTROL "IF ALARMHI GOTO QUIT"
SEQUENCE:STEP:CONTROL "GOTO START"
SEQUENCE:STEP:CONTROL "LABEL QUIT"
SEQUENCE:STEP:CONTROL "HALT 0"

Analysis of the steps in the definition above show the user wants to make a measurement anytime a trigger occurs, test the ALARMHI condition, and if true conclude the sequence. Otherwise an unconditional jump occurs back to the beginning of the sequence and the process starts again. Although in reality the hypothetical query as defined earlier never returns an ALARMHI condition, the master message processor has no knowledge of this fact because of the abstraction that occurs between it and the shared libraries. The executing sequence in this particular example will therefore never terminate by itself. Nevertheless, the example perfectly illustrates indeterminate execution that results in data collection into perpetuity and why managing result memory overflow/roll-over conditions dynamically are so important.

In the context of the SCPI commands transmitted by the user above, the source measure switching system after completing initial message processing and validation activities technically distills this into a simpler "pseudo SCPI program". Thus in the example above, the distilled version containing the intended deferred commands and line numbers to indicate position appears as follows:

1 WAITTRIG
2 JKL?(@1,4)
3 IF ALARMHI GOTO 5
4 GOTO 1
5 HALT 0

Figure 14:
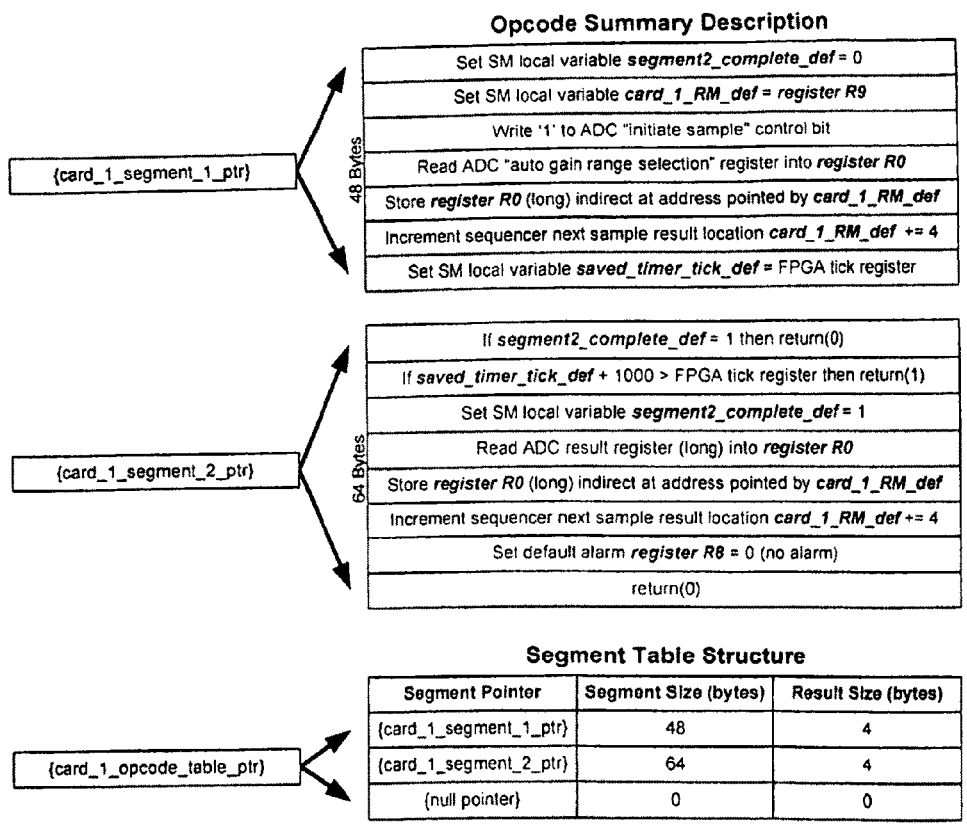
FIG. 14 shows a block diagram of opcode segments and a segment table in accordance with an embodiment of the invention.

Stated earlier, shared library API calls to generate_opcode_segment_table( ) will build segments and tables to cater to either the immediate or deferred sequencers based on the type passed into prior API calls to slot_SCPI_message_validate( ). With the assumption that both cards in the first and fourth slots find the "JKL?" command valid for deferred execution, the segments and tables illustrated in FIG. 12 for immediate execution take a slightly different form for deferred execution. Since both the immediate and deferred sequencers can in some cases operate concurrently, local variables used in scratch memory must reflect the sequencer they represent. FIGS. 13 and 14 reflect the allowances made by the shared libraries to accommodate this reality.

Figure 16:
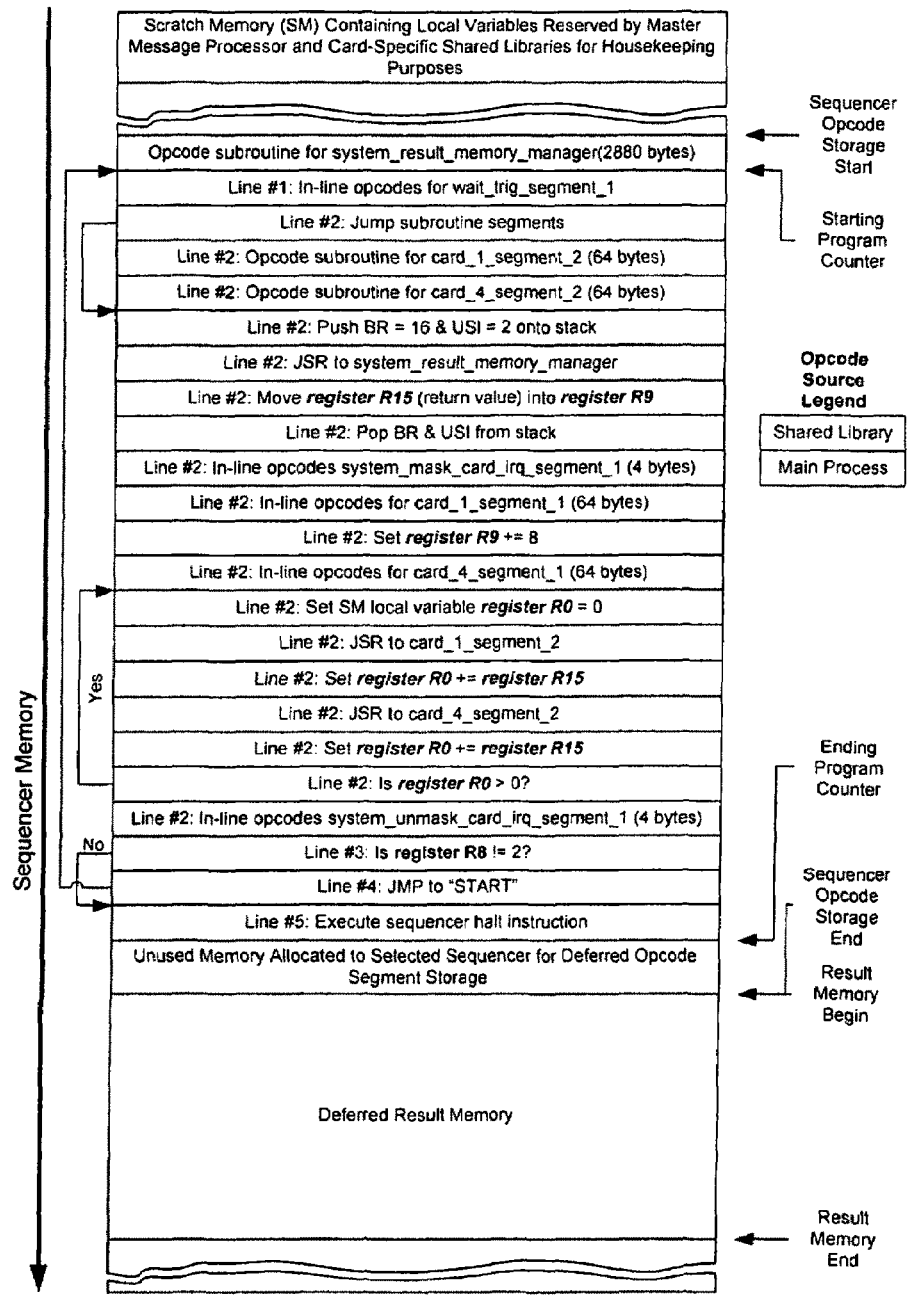
FIG. 16 shows a diagram of a query sequencer segment interleaving (deferred) in accordance with an embodiment of the invention.

Incorporating the segments in a manner that properly interleaves and assembles them into a cohesive, executable routine resembles that described in FIG. 16. Here again, the value of performing a comparison between it and FIG. 13 quickly reveals several important distinctions. Unlike immediate execution that does not need to contend with memory roll-over issues, the deferred situation depends on a more sophisticated approach. Note that in addition to any other subroutine-based segments the master message processor must load, it always includes a dedicated routine for handling result memory when one or more queries exist in the overall sequence.

This special system segment/subroutine has the responsibility of finding a suitable location of result memory with enough storage capacity for the next pending query operation, monitoring result memory wrap-around/full conditions, and insuring the oldest data drops off while maintaining the integrity of all other result data in a FIFO fashion. The subsection, Result Memory Management During Sequencer Execution, will focus in great detail on the exact algorithm and technique used internally by the routine. For now however, defining the inputs and outputs of the memory management subroutine in the context of sequencer interleaving, assembly, and execution activities will suffice.

In basic terms, the result memory manager routine expects two parameters passed on the sequencer stack before being called. Obviously to locate a suitable location for the pending query, the memory manager must know the total number of result bytes that are needed by the upcoming query. Additionally in the interest of recovering and post-processing data after sequence execution, the memory manager needs a unique way to associate stored data with the actual command that generated it.

Memory size for a given command derives very easily from the segment tables provided by shared libraries, or in the case of a system segment, from internal knowledge. As FIG. 14 and FIG. 15 highlight in the current hypothetical example, each SCPI message fragment consumes a total of eight bytes for each card. The data storage requirement to capture result data for the message "JKL?(@1,4)" therefore requires a total of 16 bytes and is the first parameter pushed onto the stack.

The second parameter, or the Unique Segment Identifier (USI), has a different but very simple origin. The USI is really nothing more than the line numbers in the "pseudo SCPI program" that derives from the commands defined by the user. In the present hypothetical example, the USI for the "JKL?" query is line two. Therefore in addition to value of 16 pushed earlier representing the total data bytes required, the second parameter pushed onto the stack will have this value.

As FIG. 16 indicates, during execution, the sequencer 130 will then call the result memory manager. The subroutine will convey the address value for the next result memory location to use in the sequencer's return value register R15. Convention earlier dictated that register R9 be used as the result memory pointer in all query segments. Therefore the master message processor inserts system instructions to copy register R15 into register R9 and also pop the pushed parameter values on the stack following any call to the memory manager.

In the case of immediate sequencer operation described earlier, the master message processor strategically located instructions to enable and disable card-level interrupts feeding into the sequencer. It did this to insure that a fault in any given segment did not inadvertently propagate into others as a result of uncontrolled sequencer shutdowns caused by card interrupts. The same concern exists for execution within the deferred sequencer. The master message processor must therefore exercise similar care when assembling sequences intended for it.

Whereas immediate sequencer execution involves only a single command at a time, immediate sequences will usually contain only a single pair of interrupt masking and unmasking instructions. In the case of deferred sequences, however, a sequence may consist of one or many SCPI commands and consequently will contain multiple pairs of masking/unmasking instructions. As a general rule of thumb, the master message processor must insert an instruction in the sequence to mask all card-level interrupts prior to executing the first segment of any SCPI command and leave them masked until all segments finish execution. With the conclusion of segment execution representing the SCPI command complete, the master message processor will insert an instruction to unmask the interrupts and pending, masked interrupts (if any) to halt the sequencer if necessary. Otherwise if more commands follow, the interrupts are re-masked and the cycle repeats.

At this point the segments representing the simple user-defined sequence defined earlier are ready to execute and have been fully elaborated from a technical implementation standpoint. The next major step in understanding the deferred sequencer rests with result data management.

Result Memory Management During Sequencer Execution

In the prior subsection, a detailed understanding of the mechanics used to construct sequences for both immediate and deferred execution developed. Although of less concern to the immediate execution sequencer because of underlying simplifications and restrictions, the deferred sequencer faces a much more difficult challenge managing result memory in a satisfactory manner. While focusing on the operation of the deferred sequencer in the prior subsection, FIG. 16 and its associated discussion presented the concept of a dedicated subroutine to handle result memory management.

Of the challenges this memory manager must contend are disparate data sizes from one query command to the next, data buffer wraparound, and handling overwrite properly. This insures that new data added to a saturated result buffer only drops the minimum number of oldest samples to store a new result. All of these tracking activities must take place in real time and be completely independent of CPU support during sequence execution.

If each sample required exactly the same amount of memory from one command to the next, finding the starting and ending locations of the oldest sample would prove to be a straightforward task in a circular buffer. Since this is not the case in the source measure switching system 100, a more sophisticated tracking approach will need consideration. Thus the source measure switching system architecture implements a more sophisticated approach through the use of a separate tracking table.

Unlike sample collections that can be of any size, a tracking table consists of entries each containing two components of information: an identity tag (what the data associates with) and a pointer to a location in result memory that represents the first location of any given sample. For the purposes of the source measure switching system tracking table, the identity tag assumes the value of the Unique Segment Identifier (USI) discussed earlier. The pointer to the starting location of a given result sample is hereafter referred to as Sample Start (SS). Since the USI and SS parameters stored in a table entry are always of a consistent size, finding any particular table entry only requires changing the table index by a fixed offset.

Figure 30:
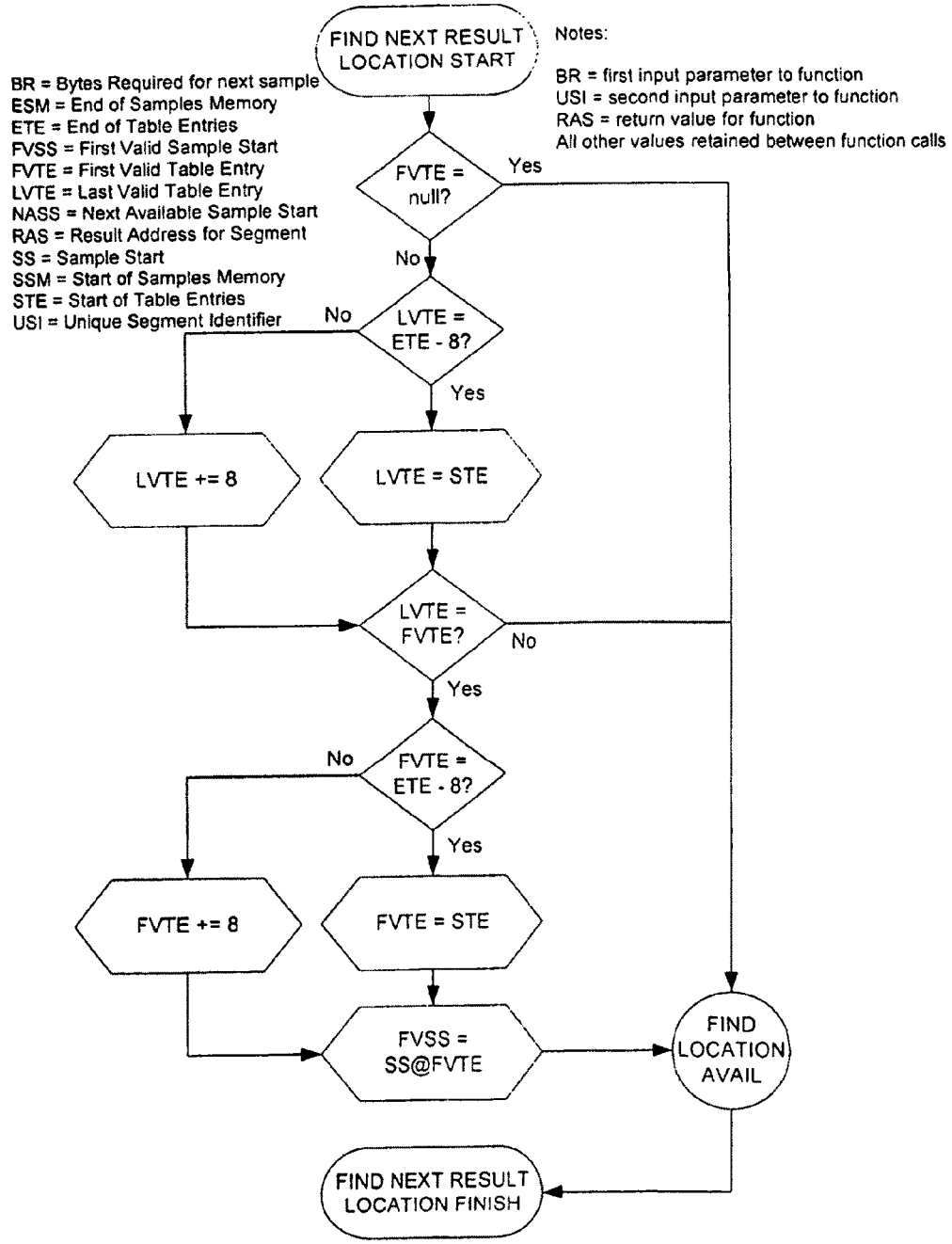
FIG. 30 shows a result memory management algorithm flowchart in accordance with an embodiment of the invention.
Figure 31:
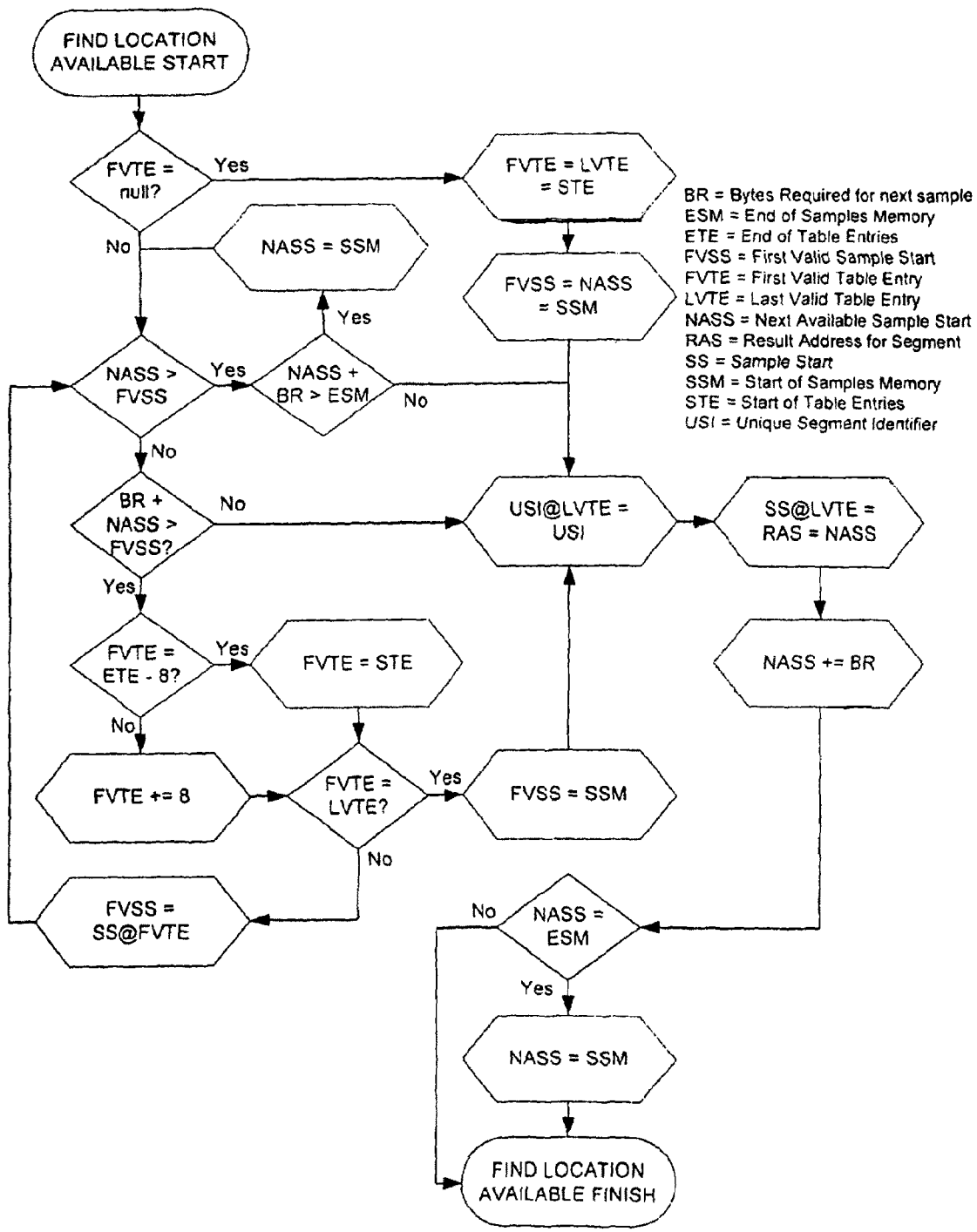
FIG. 31 shows a result memory management algorithm flowchart in accordance with an embodiment of the invention.

Seeing graphically how this table interacts with result memory across various sample sizes appears in FIG. 17 through FIG. 29. For illustration purposes, these figures presume a table size of four entries and a total result memory size of eight bytes. Obviously sizes this small are impractical in a real situation, but they make rapid visualization of edge-cases possible and test the exact algorithm shown concisely in FIG. 30 and FIG. 31.

Figure 17:
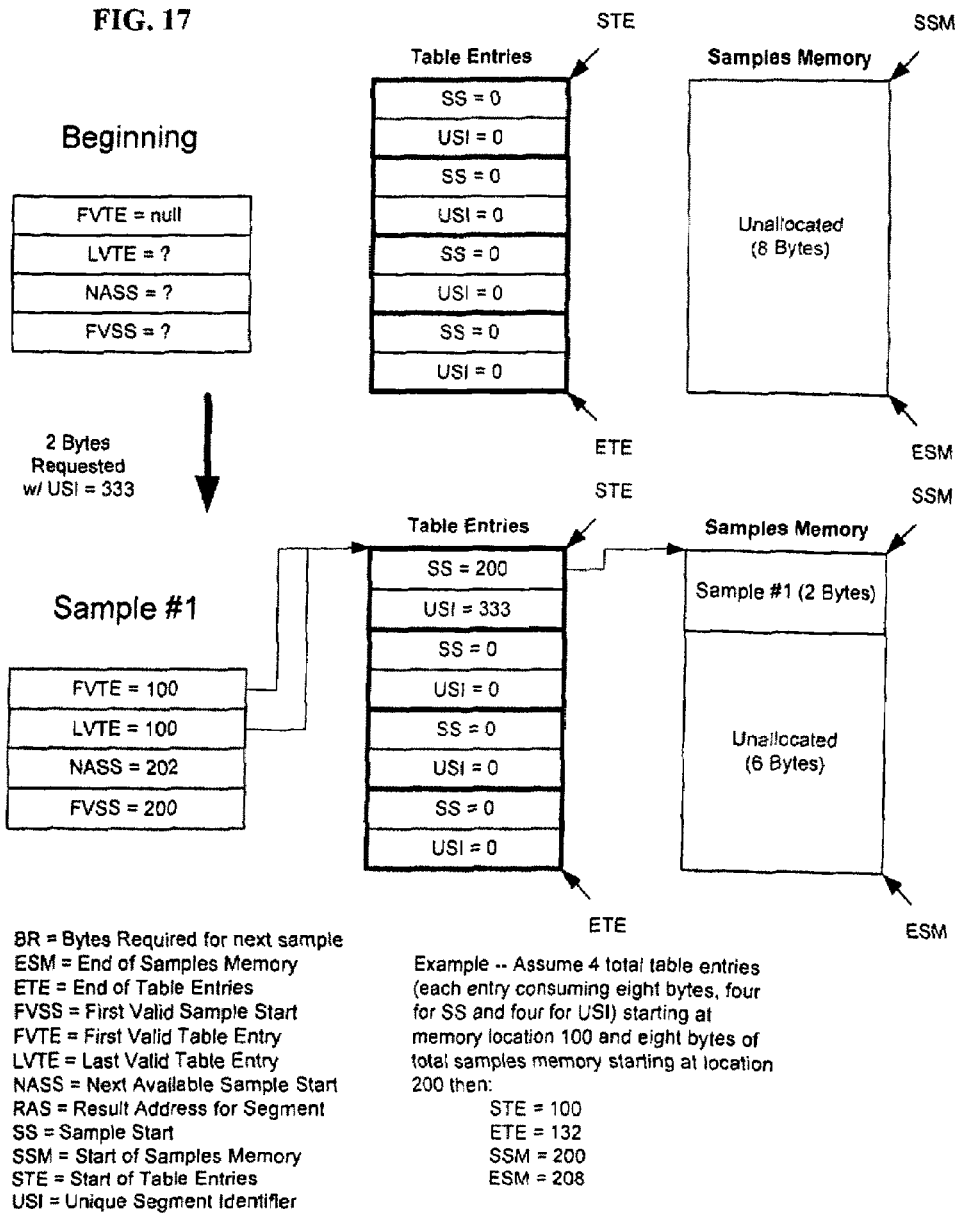
FIG. 17 shows a sample of a sequencer result memory in accordance with an embodiment of the invention.

Note that in FIG. 17, the scratch memory variable First Valid Table Entry (FVTE) has a value of null prior to receiving the first sample. Prior to commencing sequencer execution, the master message processor presets this scratch memory local variable and certain others used by the management algorithm as follows: End of Samples Memory (ESM): This value contains the pointer referencing one byte past the final location in result memory.

End of Table Entries (ETE): A table entry consists of a long word tag (UID) of 4 bytes along with a long word pointer (SS) of 4 bytes. Each table entry therefore requires a total of eight bytes. ETE is therefore equal to: the number of table entries the user has requested in advance *8+ the starting location of result memory+1.

First Valid Table Entry (FVTE): This value is always set to null to tell the memory management algorithm that no samples are currently stored in sample memory.

Start of Sample Memory (SSM): Since the user has the capability to set the overall size of result memory and proportion it between the tracking table and raw sample memory, SSM typically gets set equal to ETE for optimal use of result memory. In actuality though, SSM may legally assume any value greater than or equal to ETE, but less than ESM (as is the case with the hypothetical sample assignments illustrated in FIG. 17 through FIG. 29).

Start of Table Entries: This value is typically set to starting location of result memory.

For illustration purposes, presume that the start of result memory arbitrarily begins at address 100 and the end of result memory occurs at address 208. With the configuration details and rules defined thus far it follows that: STE=100, ETE=132, SSM=200 and ESM=208. With these example parameters defined focus may now return to FIG. 17.

In the case of the hypothetical first sample, the result memory manager subroutine receives a request for two bytes of storage and a USI of 333. Since FVTE is null when the sequencer first starts, the algorithm knows that the tracking table/sample memory is empty and can use the very first table entry for the sample. Hence as this figure reveals, the memory manager sets both FVTE and LVTE equal to location 100 (the first table entry). Within the table entry, it sets USI to 333 and SS to 200 since this represents the start of sample memory. The local variable FVSS which represents the first valid sample starting location is set to 200. NASS which represents the next available location in result memory is the sum of FVSS plus total bytes consumed. So for the first sample NASS assumes a value of 202. The subroutine returns with the value of 200 telling the caller to lay down the two bytes of data at this location.

Figure 18:
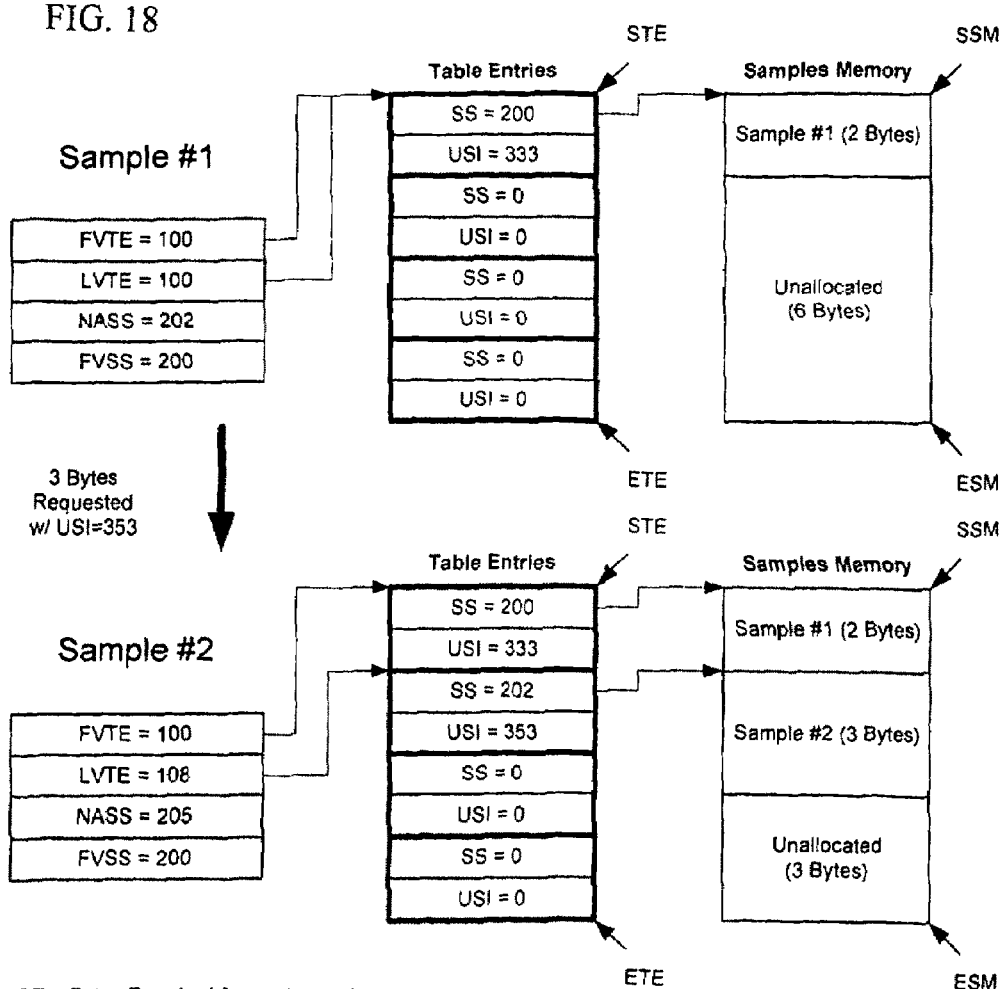
FIG. 18 shows a second sample of a sequencer result memory in accordance with an embodiment of the invention.

For the second hypothetical sample illustrated in FIG. 18, the result memory manager subroutine receives a request for three bytes identified with a USI of 353. Since NASS plus three is less than ESM and FVSS is less than NASS, the memory manager knows that this sample won't overrun the end of sample memory nor will it overrun a prior sample. It also knows that LVTE is greater than or equal to FVTE, so a free table entry exists and LVTE is incremented by eight. It sets the current table entry USI to 353 and SS equal to NASS. NASS is then incremented by three to a new value of 205. In this case, the memory manager subroutine returns with the value of 202 telling the caller to lay down three bytes of data at this location.

Figure 19:
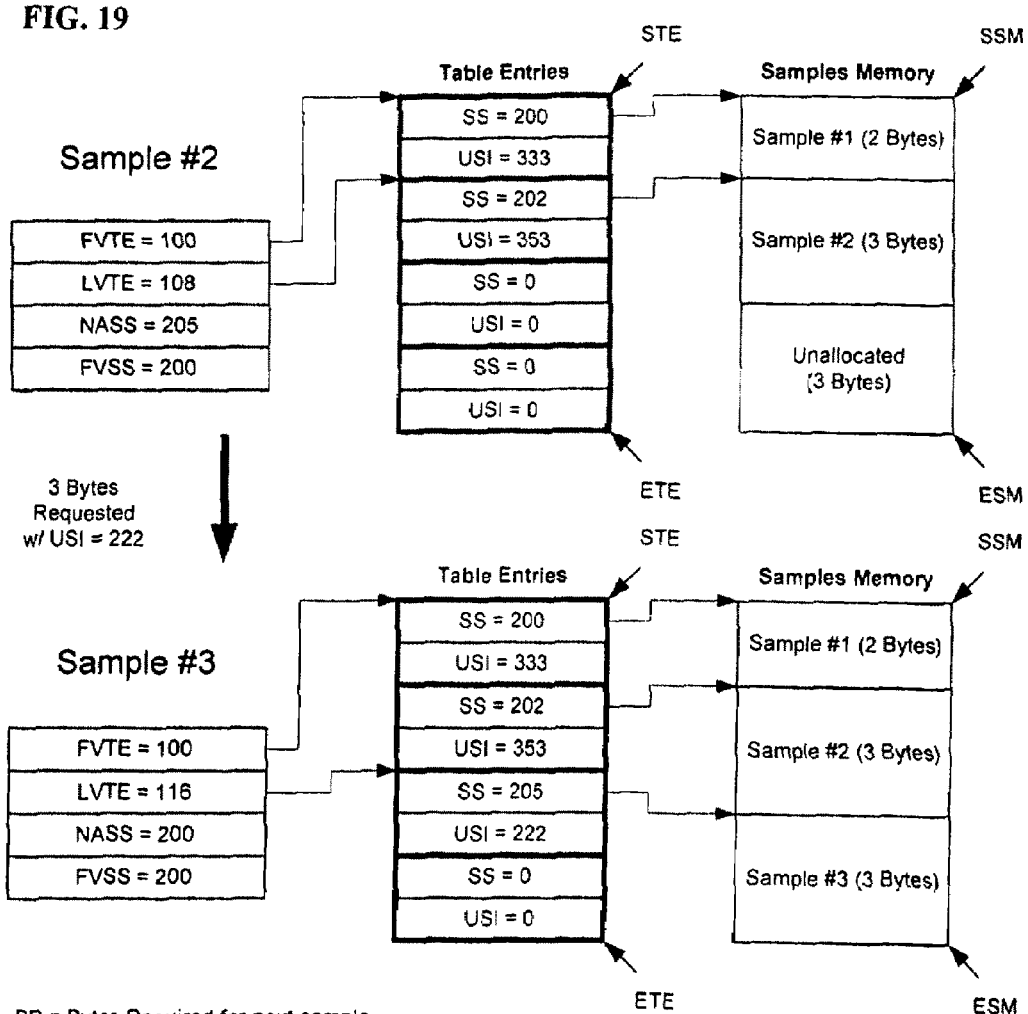
FIG. 19 shows a third sample of a sequencer result memory in accordance with an embodiment of the invention.

FIG. 19 shows how the memory manager reacts to a memory request for the third sample. In this situation the caller requests another three bytes using a USI of 222. Along the same lines of the previous sample, the memory manager sees that three bytes won't overrun the end of sample memory and knows that a free table entry exists. It therefore increments LVTE by eight to a new value of 116, and sets the table entry SS equal to NASS (currently 205), and the USI to 222. The first edge-case occurs now when the memory manager increments NASS by three and discovers the value would exceed the end of sample memory. So instead it sets NASS back to the beginning of sample memory or address 200 and the memory manager returns from the subroutine with a value of 205 telling the caller where to lay the three bytes requested for this sample.

Figure 20:
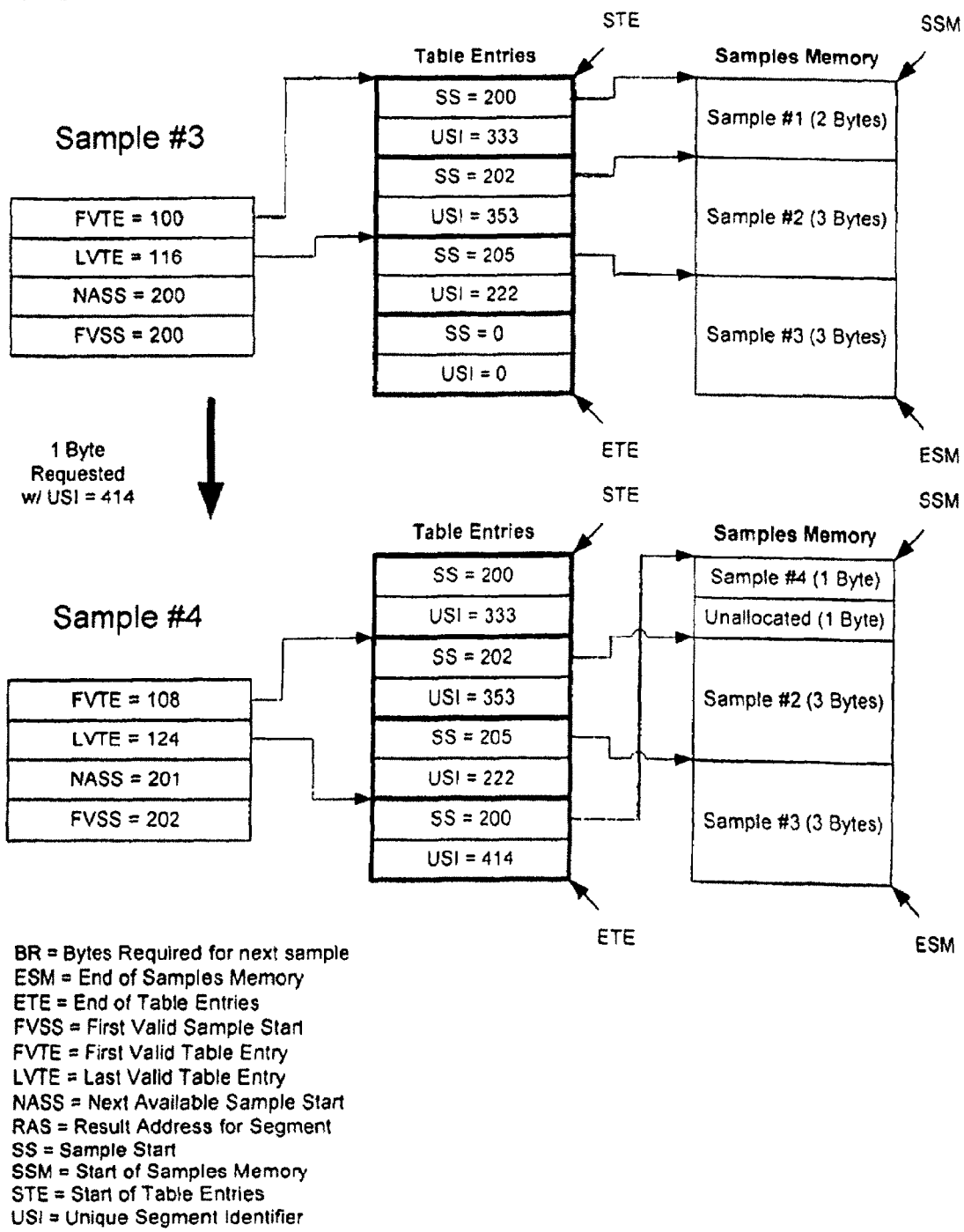
FIG. 20 shows a fourth sample of a sequencer result memory in accordance with an embodiment of the invention.

Moving onto a hypothetical fourth sample of a single byte associated with a USI of 414, FIG. 20 demonstrates the activities of the memory manager subroutine in this situation. This sample heralds the next edge-case. Since NASS plus one new sample byte exceeds FVSS, the memory manager knows that one or more of the oldest samples must be discarded. The memory manager then increments FVTE by eight bytes (equal to one table entry) setting it to a new value of 108 and adjusts FVSS to reflect the starting address of the second sample. Once it does this it now checks to see if NASS plus one new sample byte will overrun the next oldest sample starting at location 202. In this case it doesn't and therefore no more old samples will need to be discarded.

As has been the case for previous samples, the memory manager increments LVTE by eight which then equals 124. Since LVTE points to a valid unused table entry that doesn't overrun the table, it sets the entry's USI value to 414 and its SS value to 200 representing the current value of NASS. Finally it increments NASS by one to account for the byte requested and then returns from the call with a value of 200. The caller then knows where to place the single byte for the fourth sample.

At the conclusion of the fourth sample, only samples two through four are now available in the result memory. Presuming that the memory manager now receives a request for another byte using a USI of 456, it discovers the fifth sample will neatly fit between the second and fourth samples. It knows this because NASS plus one byte for the sample is less than or equal to FVSS. It then increments LVTE by eight and discovers that this would overrun the tracking table.

Figure 21:
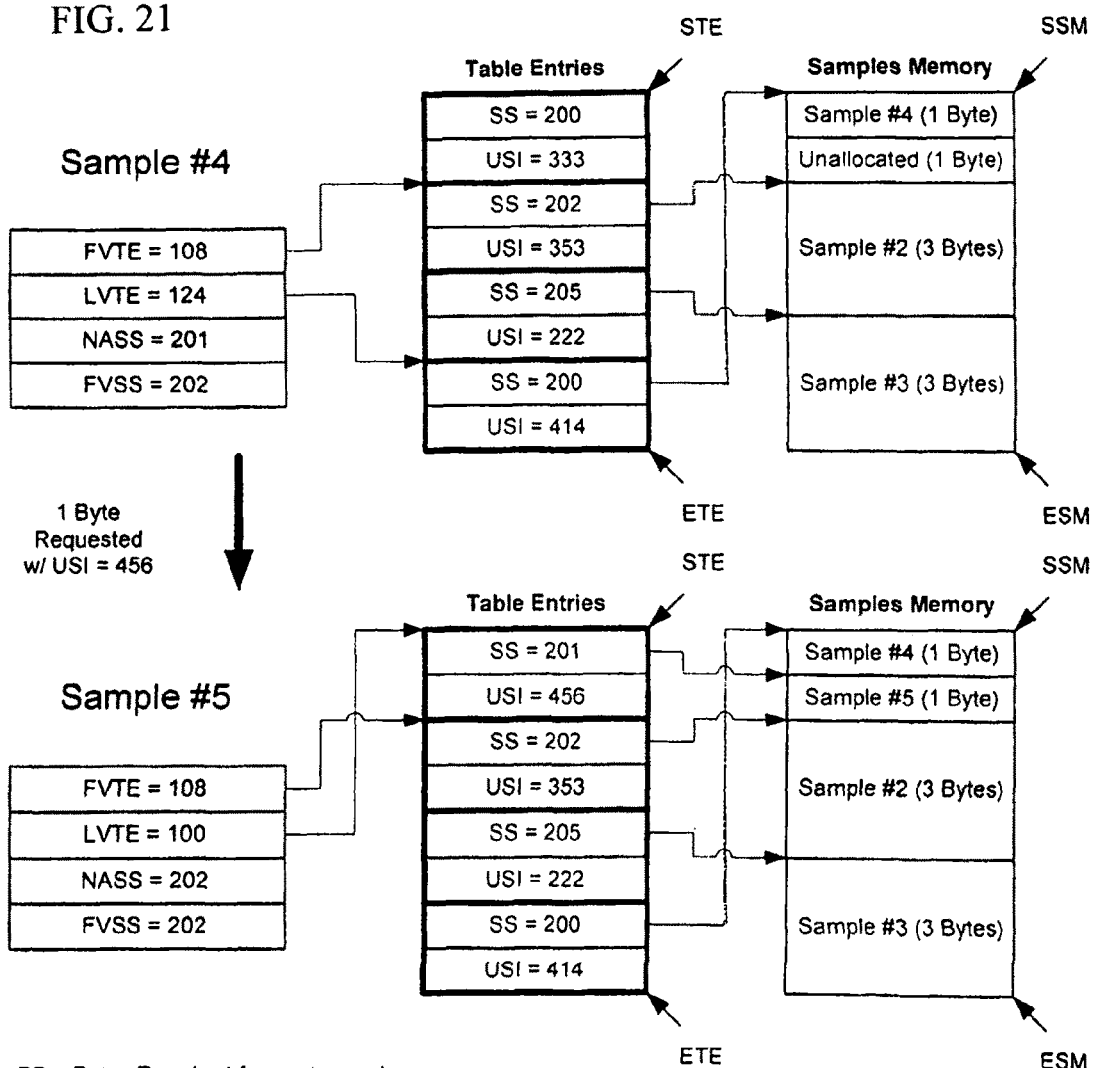
FIG. 21 shows a fifth sample of a sequencer result memory in accordance with an embodiment of the invention.

So in this edge-case, the memory manager resets LVTE back to the beginning of the table or location 100. Once it does this however, it needs to make sure that LVTE does not exceed FVTE or one or more of the oldest samples must be dropped. In this case FVTE is 108 and therefore this is not a problem. With this determination made as illustrated in FIG. 21, the memory manager sets the table entry's SS value equal to the current value of NASS or 201 and its USI equal to 456. Once NASS is incremented by one to a new value of 202, the memory manager returns a value of 201 to the caller. The caller then knows to put the fifth sample at this location.

Figure 22:
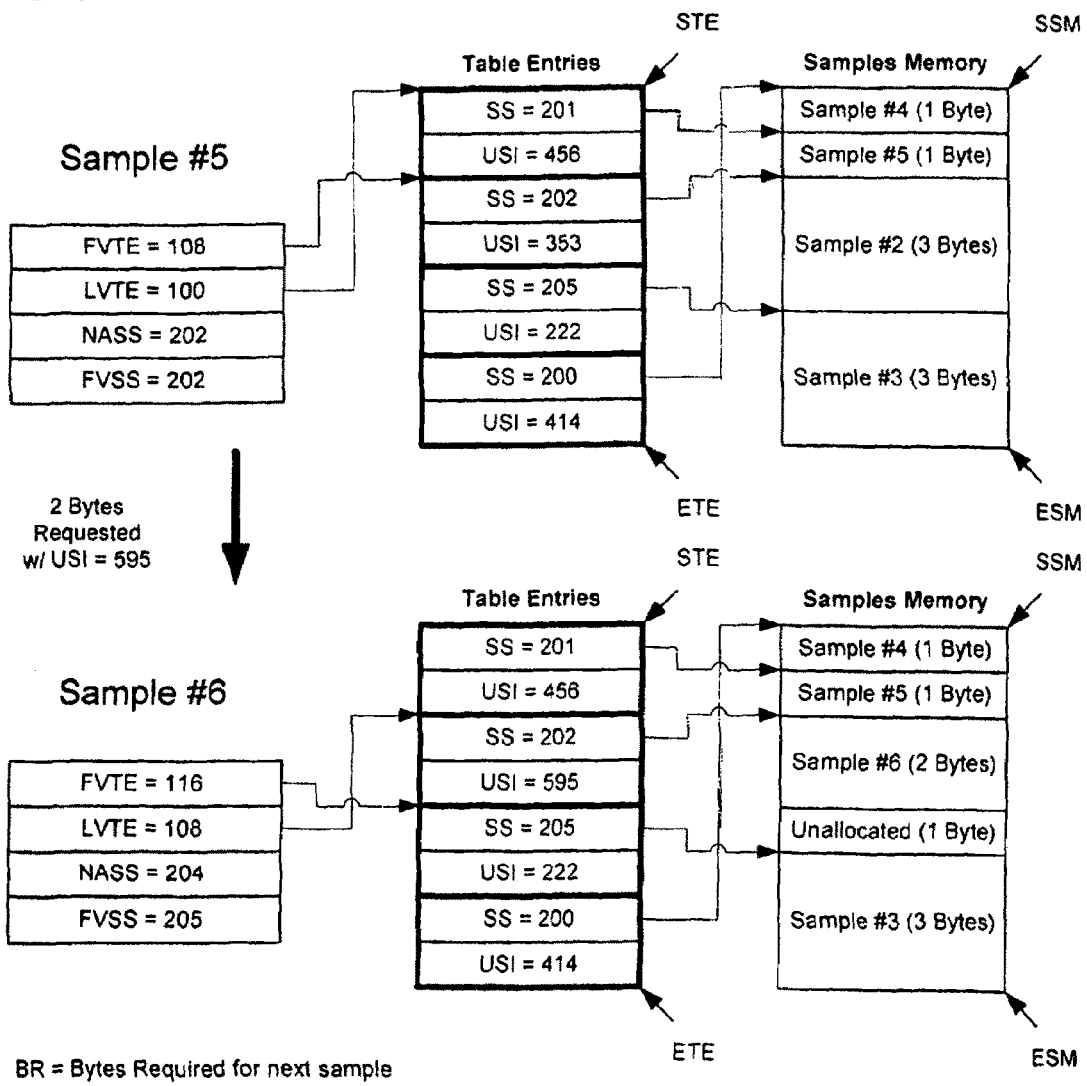
FIG. 22 shows a sixth sample of a sequencer result memory in accordance with an embodiment of the invention.
Figure 23:
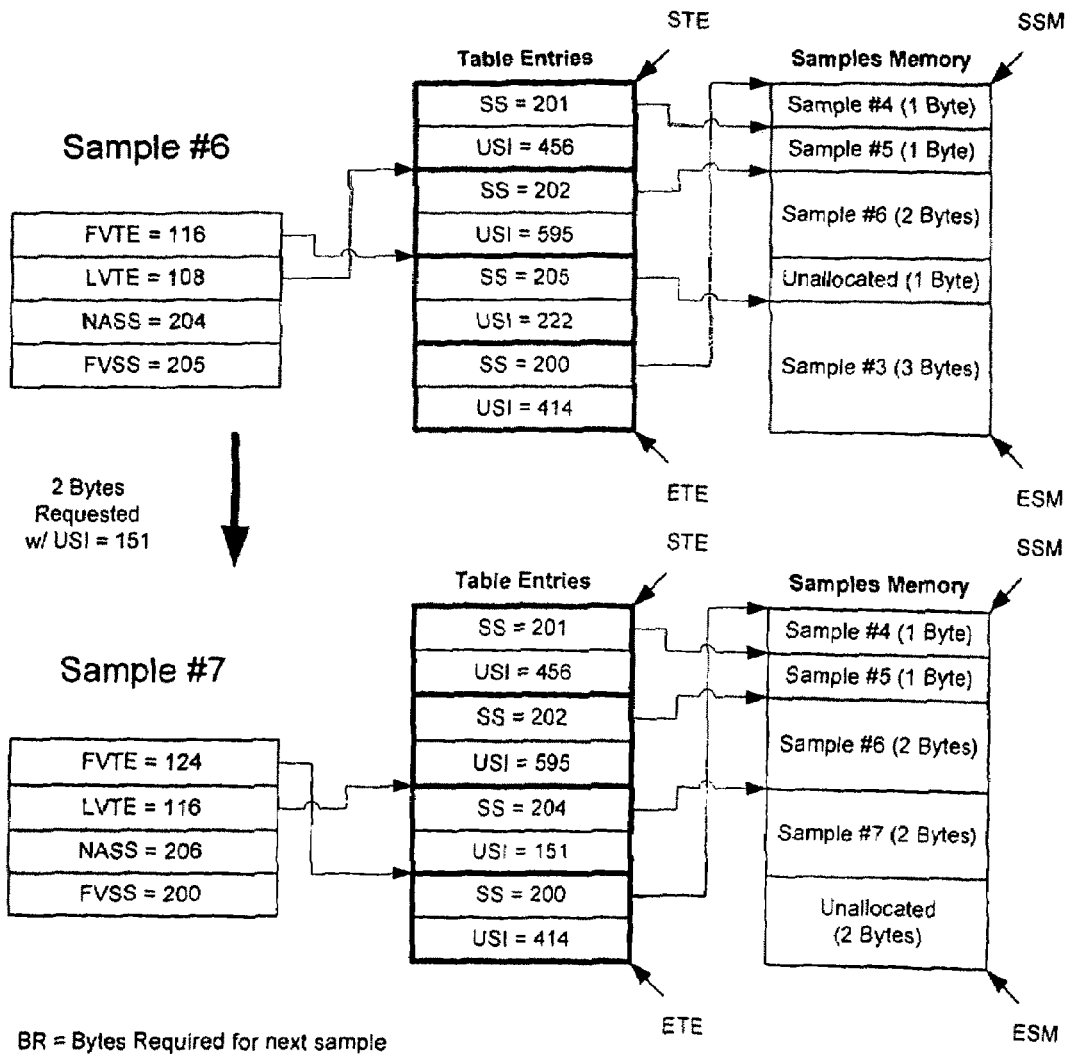
FIG. 23 shows a seventh sample of a sequencer result memory in accordance with an embodiment of the invention.
Figure 24:
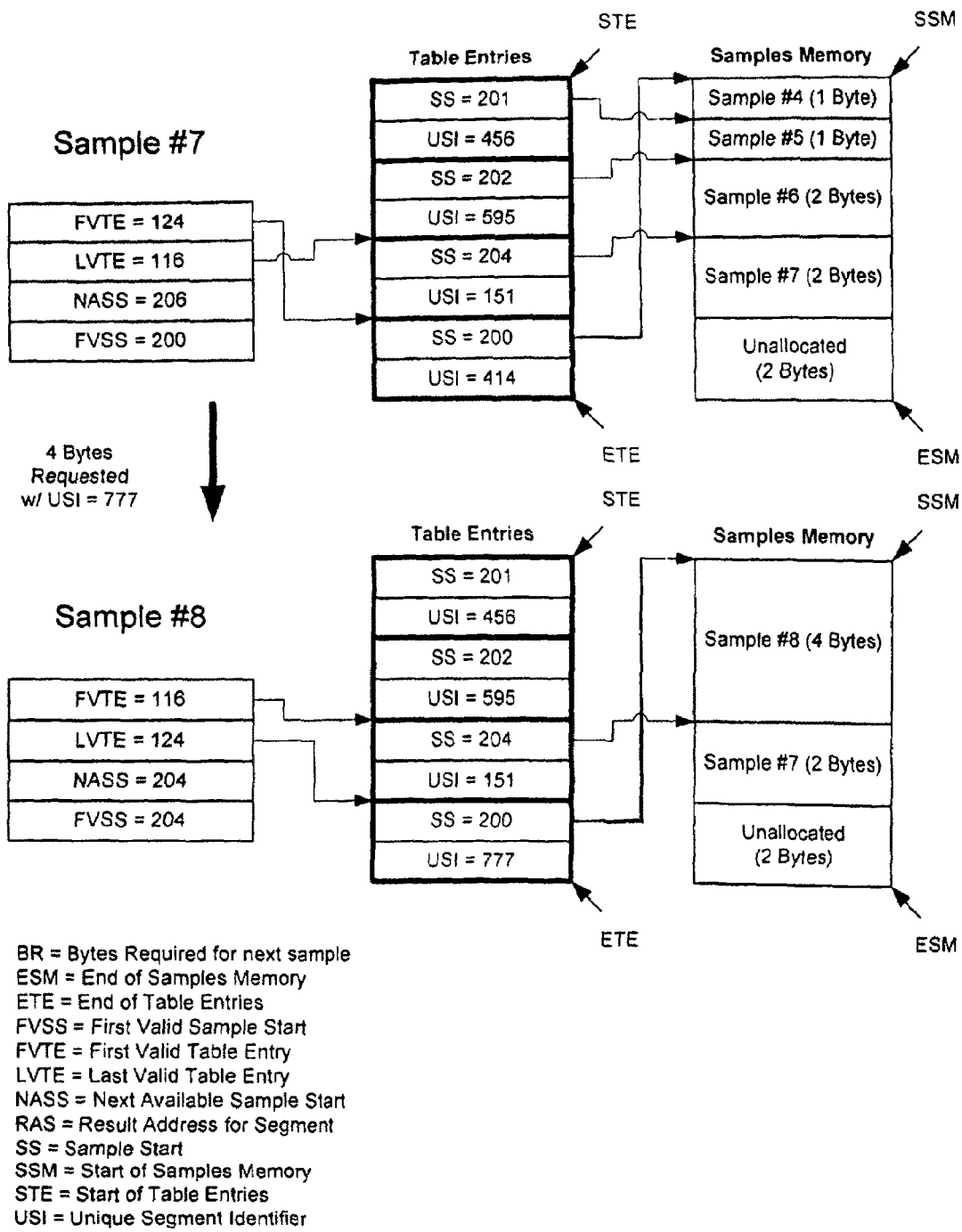
FIG. 24 shows an eighth sample of a sequencer result memory in accordance with an embodiment of the invention.
Figure 25:
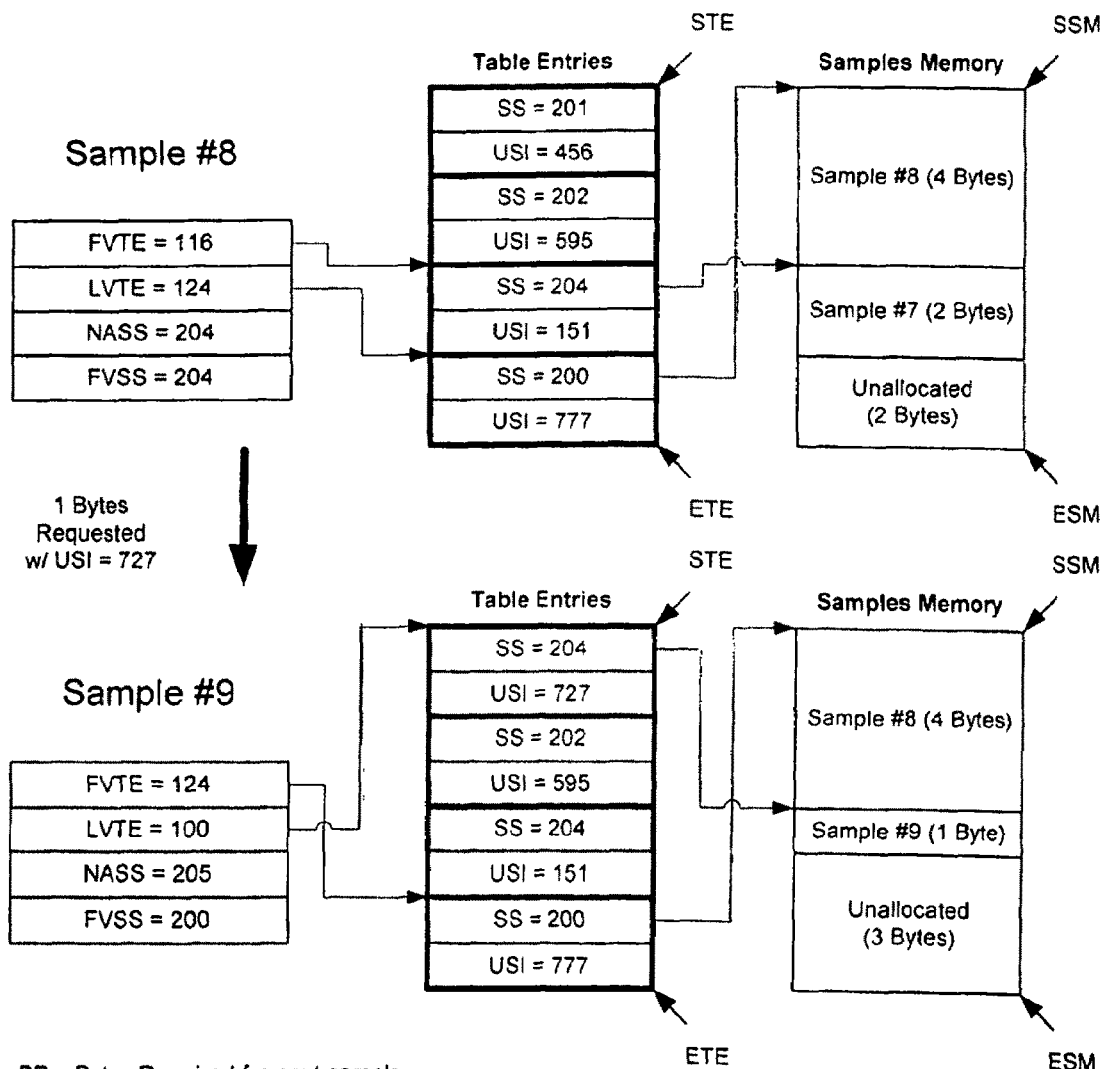
FIG. 25 shows a ninth sample of a sequencer result memory in accordance with an embodiment of the invention.
Figure 26:
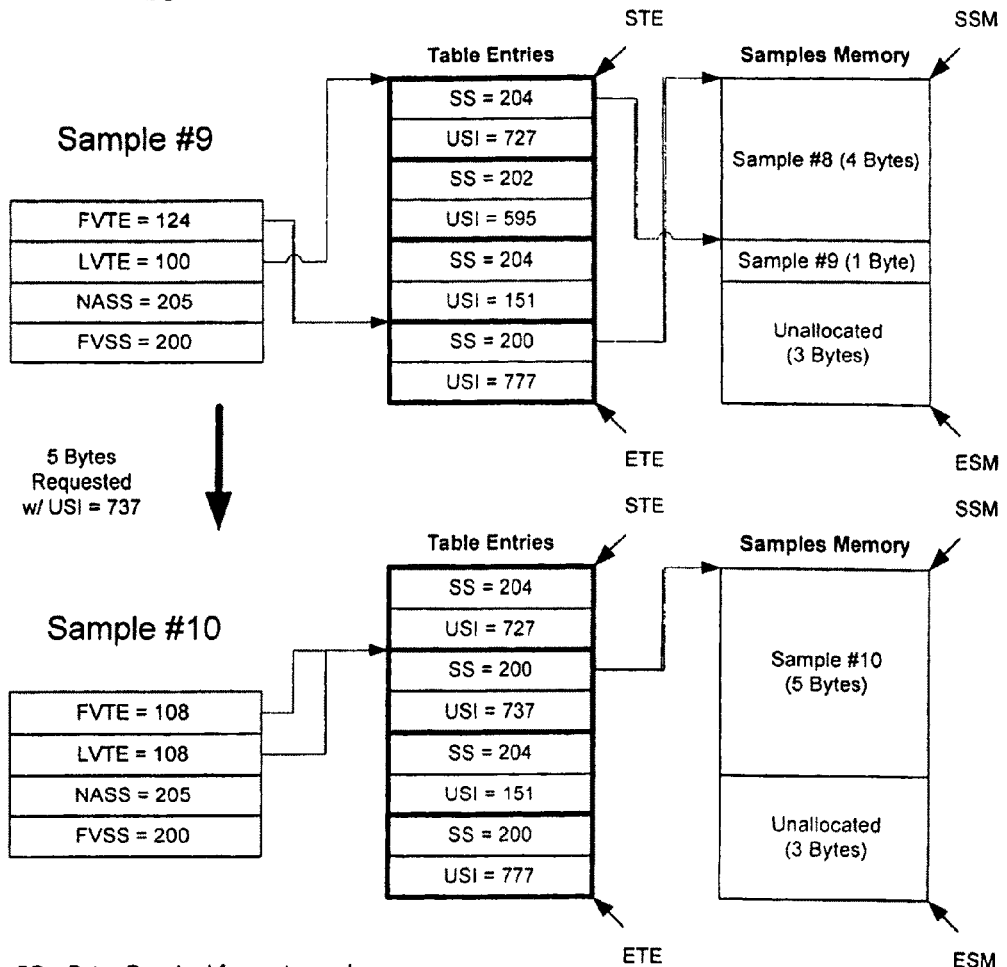
FIG. 26 shows a tenth sample of a sequencer result memory in accordance with an embodiment of the invention.
Figure 27:
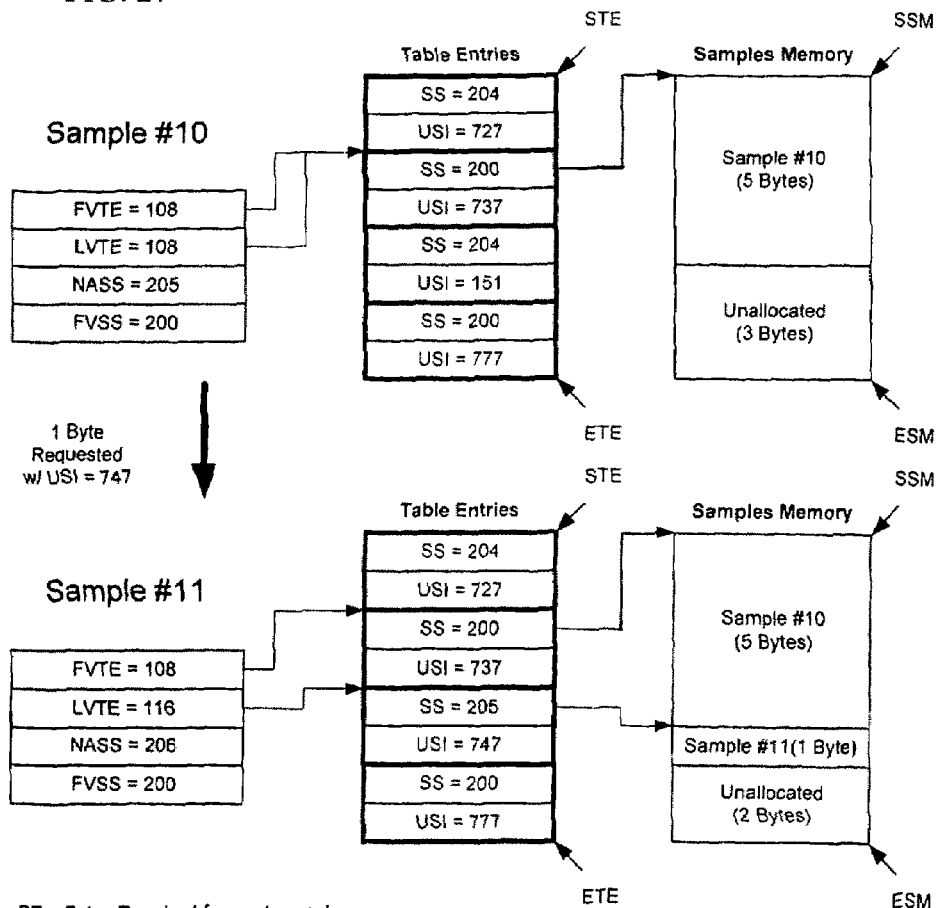
FIG. 27 shows an eleventh sample of a sequencer result memory in accordance with an embodiment of the invention.
Figure 28:
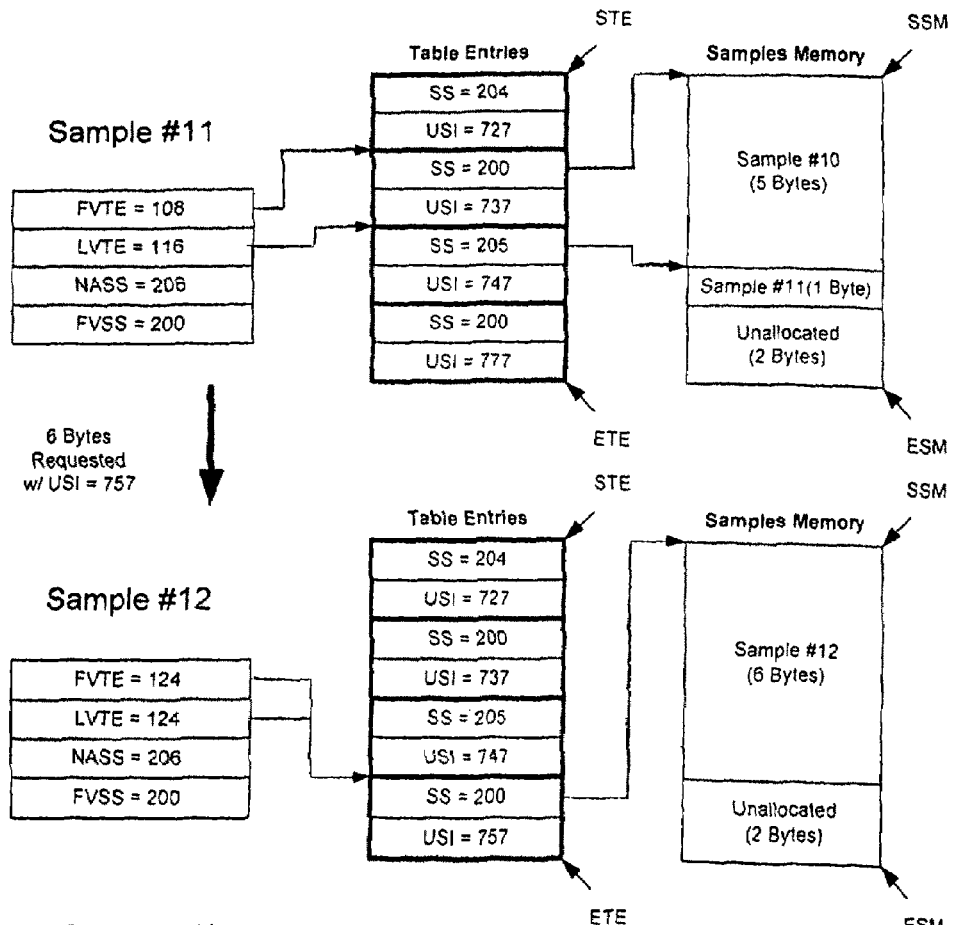
FIG. 28 shows a twelfth sample of a sequencer result memory in accordance with an embodiment of the invention.
Figure 29:
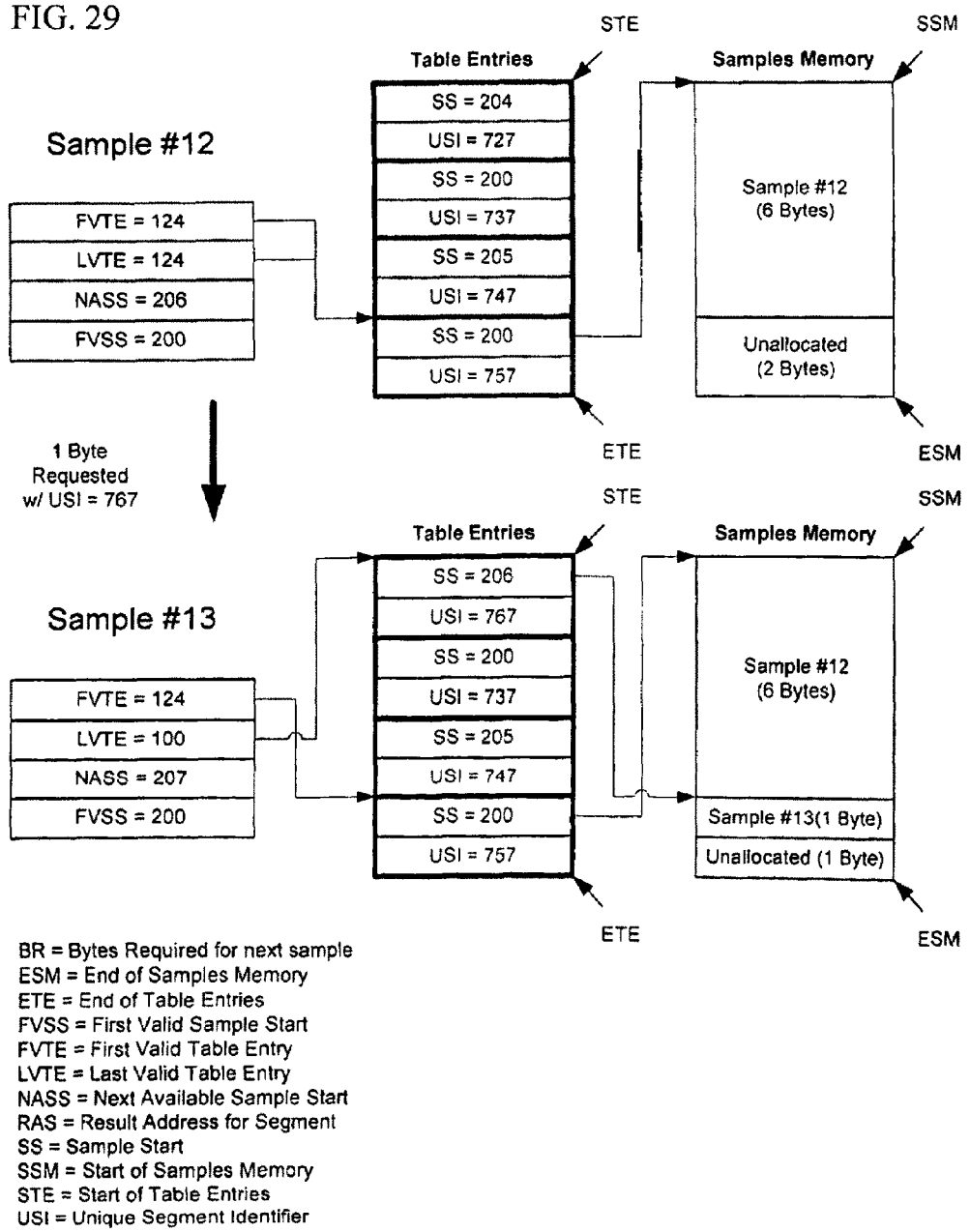
FIG. 29 shows a thirteenth sample of a sequencer result memory in accordance with an embodiment of the invention.

If the memory manager then receives a request for two bytes and USI 595 to store the sixth sample shown in FIG. 22, it faces the double edge-case where both table and sample memory are completely full. At a minimum every allocation of sample memory must have a corresponding table entry to represent it. When the memory manager increments LVTE and discovers that it now equals FVTE, FVTE must be incremented by eight to drop the oldest sample. In the present situation this would result in the loss of the second sample. FVSS must also be reset to 205 to reflect the SS indicated for the table entry specified in FVTE.

Next, the memory manager then checks to see if NASS plus two bytes requested would overrun FVSS. Since this is not the case, it stores location 202 into SS pointed by LVTE, the USI equal to 595 and then increments NASS by two. This concludes the memory management activities for the sixth sample and the memory manager returns to the caller a value of 202.

The remaining samples seven through thirteen represent variations of various edge-cases the result memory manager faces. In conjunction with the detailed descriptions and elaborations of earlier samples, FIG. 23 through FIG. 29 should sufficiently self-explain the memory management activities for the remaining samples in the context of the algorithm provided by FIGS. 30 and 31.

Hardware Virtual Memory Threading Model

While Intel IXP465 is a very efficient processor in nature, its Expansion Bus Address size limits the memory access for each chip select to 32 MB. However, due to the 32-bit addressing capability of the XBUS, a virtual memory transport mechanism is used so the system can address up to 1 GB of the X-bus card's memory space. To achieve this, multiple transport register groups are created. Each register group consisted of 4 32-bit register set. They are: virtual write address register (VWAR), virtual write data register (VWDR), virtual read address register (VRAR), and virtual read data register (VRDR).

For X-bus write, the CPU writes to the VWARx register providing the 4-bit board selects and 1 Gbytes of address. The CPU then writes the data to the VWDRx register in which the data is subsequently transferred to X-bus.

For X-bus write, the CPU writes to the VRARx register providing the 4-bit board selects and 1 Gbytes of the address. The CPU then writes the data to the VWDRx register in which the data is subsequently transferred to X-bus. The detail of all the registers are described in Table 1, Table 2, Table 3, and Table 4.

Each transport group is independent of other groups, thus it retains the virtual X-bus read and write addresses, while another transport registers group is being accessed. With this scheme, multiple threads can access a single card independently. Thus the number of CPU external access execution overhead bus cycles can be greatly reduced. Any X-bus error will terminate the CPU bus read cycle resulting a X-bus error interrupt. Yet the previous read/write address thread information is maintained for the subsequent access once the error is removed.

Figure 32:
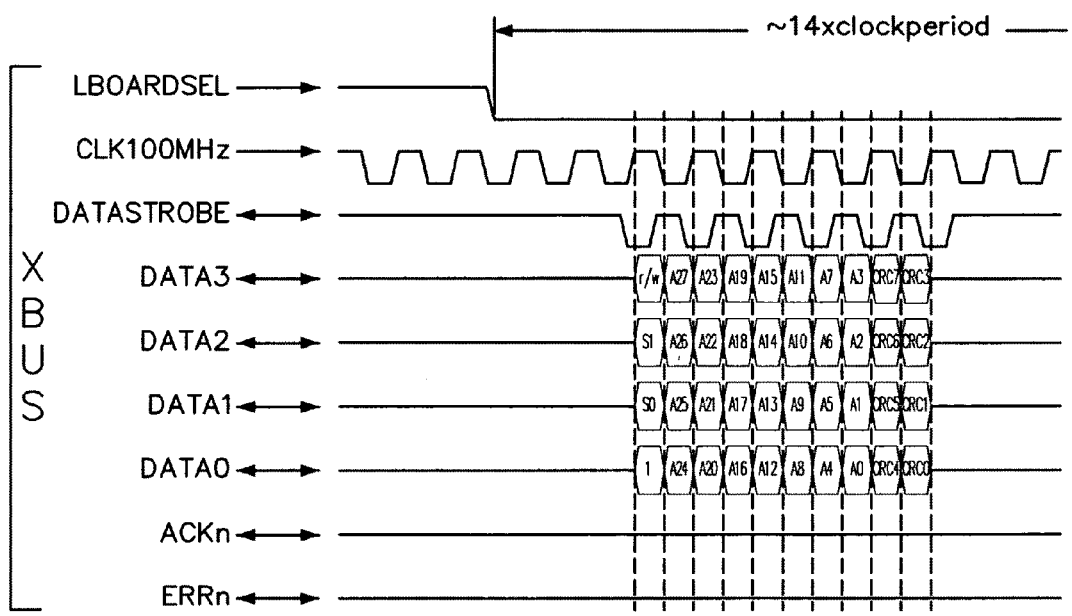
FIG. 32 shows a 32-bit XBUS Write (write to XI card) timing diagram in accordance with an embodiment of the invention.
Figure 33:
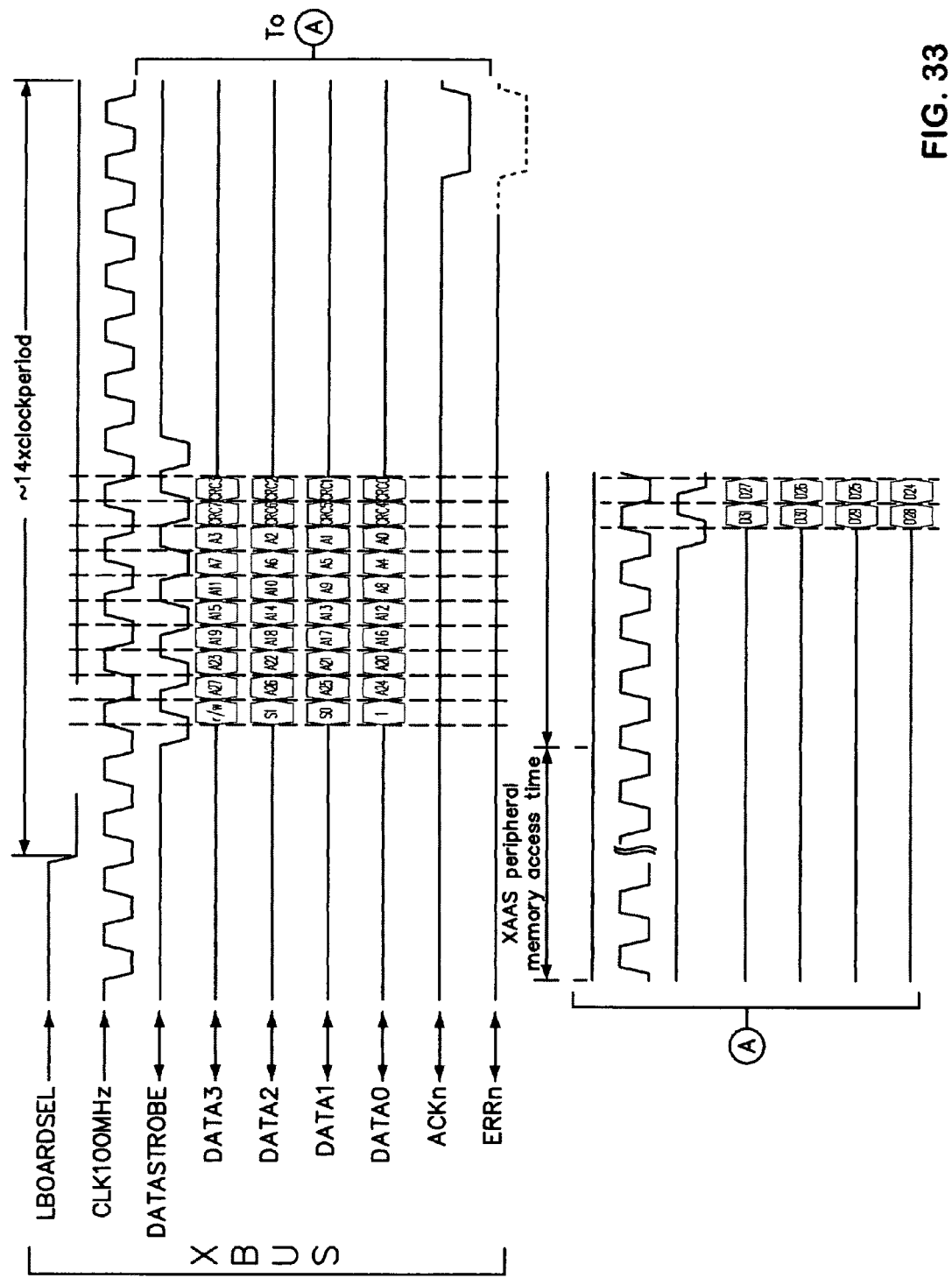
FIG. 33 shows a 32-bit XBUS Read (read from XI card) timing diagram in accordance with an embodiment of the invention.
Figure 34:
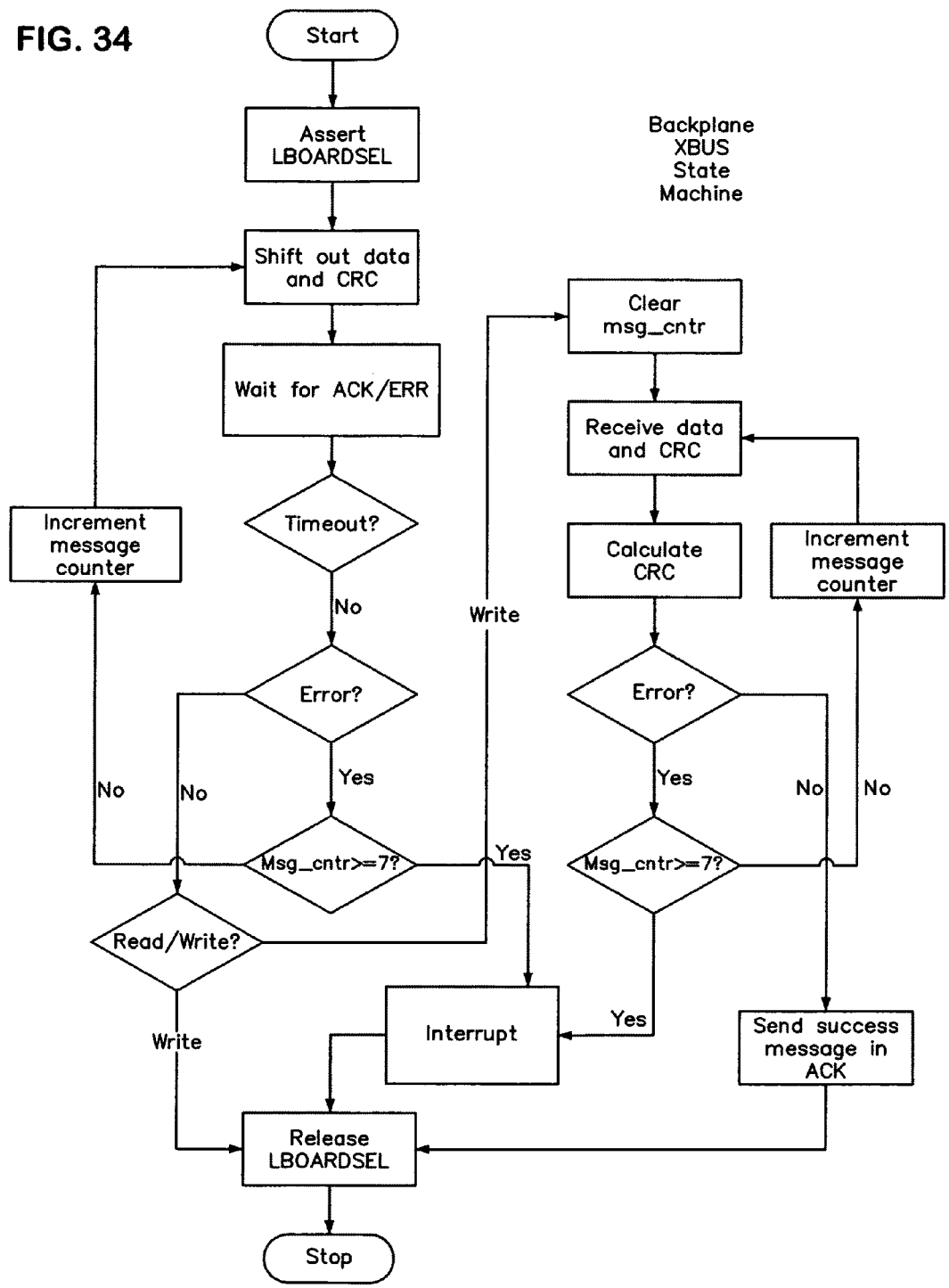
FIG. 34 shows a state diagram of a backplane XBUS module in accordance with an embodiment of the invention.
Figure 35:
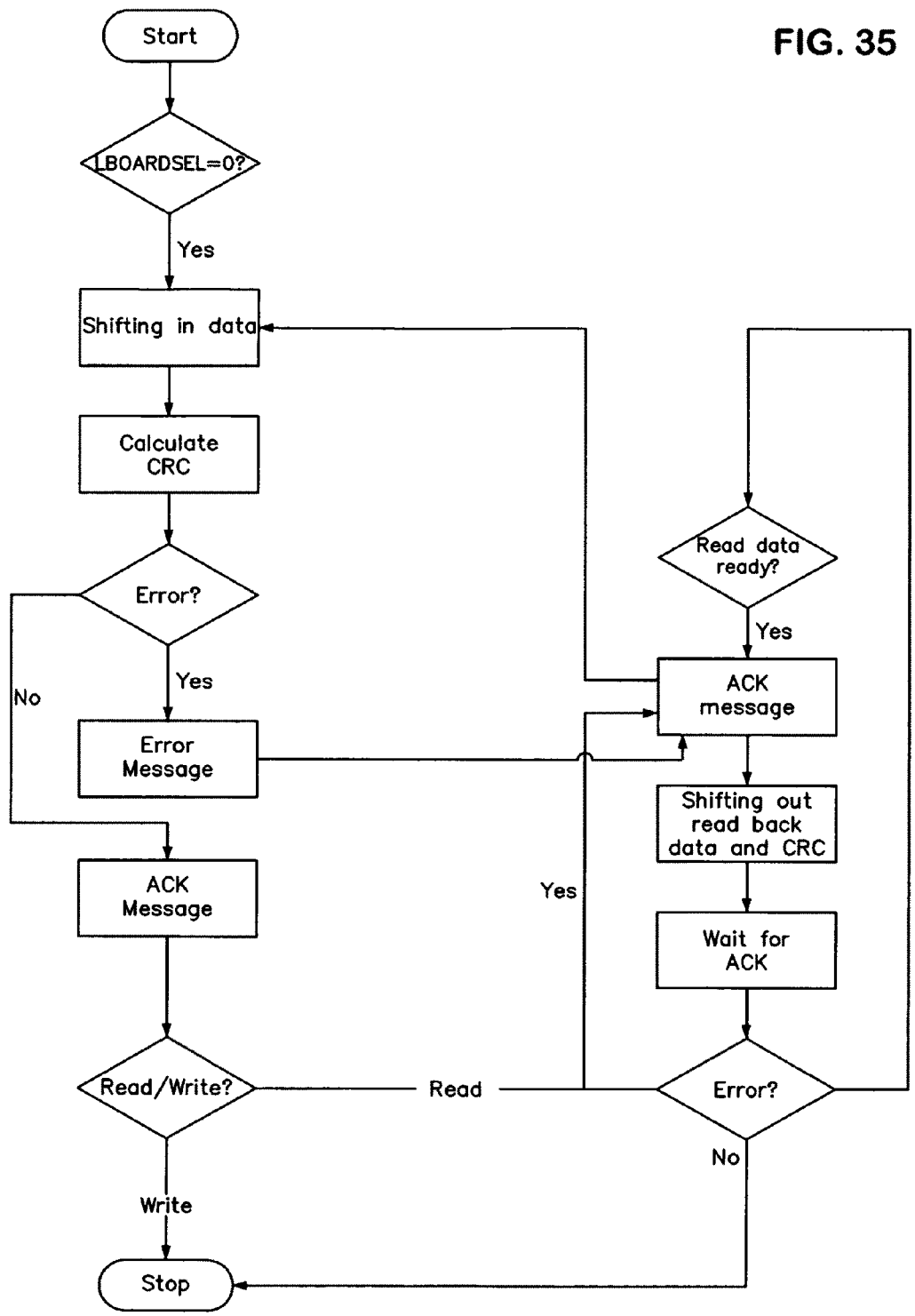
FIG. 35 shows a state machine diagram of an XI XBUs module in accordance with an embodiment of the invention.

In the test system chassis, the backplane main processor and peripheral XI cards communicate over the X BUS 128 herein referred to also as XBUS. The XBUS 128 is a bidirectional serial BUS formed by four LVDS data lines, one LVDS data strobe signal, one LVDS free running 66 MHz clock and two LVTTL acknowledge signals ACKn and ERRn. One data packet contains the combined 4 bits control bits, 28 bits address, 8 or 16 or 32 bits data and 8 bits CRC data. The components of communication packet can be seen in FIG. 1. The distribution of bits in four data lines is shown in FIG. 2. Example 32-bit write and read timing diagrams are shown in FIGS. 32 and 33. State diagrams for XBUS state machine of both XI and backplane are shown in FIGS. 34 and 35. In addition to the main communication lines, the backplane interface also contains 4 pairs of high voltage (300 V, 2 A), impedance matched (50 ohm) high signal bandwidth 2-wire analog bus lines and 8 single ended high voltage (150 V, 1 A), impedance matched (50 ohm) high signal bandwidth analog bus lines, trigger input/output signals, reference input/output clock signals, bus select, busy, interrupt, relay reset, logic reset, 4 LVTTL spare signals and power lines including +5V(5 A), +3.3V(5 A) and optional +24V(2 A) and ±12V(2 A) to module card.

The error detection method used in XBUS protocol is 8-bit CRC (Cyclic Redundancy Check). The polynomial used here is CRC-8-ATM HEC, $x^8+x^2+x+1$. Error types can be detected by using this polynomial are:
1. All single-bit errors,
3. All double-bit errors within 256 bits,
4. Any odd number of bits errors within 256 bits,
5. Burst errors of less than 8 bits.

1) XBUS Initialization
   a. Bus Initialization
   At beginning of each bus cycle, the main CPU will check the XI module "BUSYn" signal to make sure the destination XI module is ready or not. The backplane FPGA will assert the "LBOARDSEL" low if the XI module shows ready. If there is no card present or card is presenting but card is dead for some reason, then there is no response from XI. Backplane FPGA has an internal timer. It will terminate the bus cycle when time out and send interrupt to main processor.

2) XBUS Write
   a. Write Cycle Without Error
   When write to XI card, backplane FPGA sends out data packet including control bits, address, data and 8-bit CRC value to XI card. The XI card will do CRC checking when it is receiving data. If XI CRC agrees with the CRC embedded in the data stream. XI will assert the transfer success ACKn signal to backplane. After verify the ACKn signal, backplane FPGA will release LBOARDSEL signal to end the current bus cycle.
   b. ADDR/DATA Transfer Error
   If the XI card CRC checking result does not agree with CRC in data packet, then some errors occurred during the transfer. The XI card will assert ERRn signal to indicate there is error detected in the transfer. Once the backplane received the error message, the backplane XBUS engine will keep re-sending data packet until error is gone or maximum re-send numbers reached. The message counter will be increased for each time sending. Maximum number of re-send is set to 8 in configuration register in backplane FPGA. If the re-send number exceeds 8, the backplane FPGA will terminate the write cycle by releasing LBOARDSEL. Backplane FPGA will send out the interrupt to main processor and toggle the corresponding bit in interrupt status register as well. XI is also reset back to idle state due to release of LBOARDSEL signal.

3) XBUS Read
   a. Read Cycle Without Error
   When read from XI card, backplane sends out read address and 8-bit CRC to XI card at first. XI card will then assert ACKn signal if there is no error detected in address transfer. When the read back data is valid, XI will assert ACKn signal to indicate the valid read data transmission start, then continuously shift out the read back data plus 8-bit CRC. If there is no error detected in data transfer, backplane FPGA will assert ACKn signal and release LBOARDSEL signal to end the read cycle.
   b. Address Transfer Error
   If error occurs during address transfer, XI will tell backplane by assert ERRn signal. Backplane then will re-send the address to XI card until error is gone or maximum re-send numbers reached. Backplane FPGA will increment the message counter and send out the address. Maximum number of re-send is 8. If the re-send number exceeds 8, backplane FPGA will terminate the bus cycle by releasing LBOARDSEL. Backplane FPGA will send out the interrupt to main processor and toggle the corresponding bit in interrupt status register as well. XI is also reset back to idle state due to release of LBOARDSEL signal.
   c. Reading Data Transfer Error
   If error occurs during read back data transfer, backplane will assert ERRn signal to tell XI card that error was detected. XI will re-send the data until error is gone or bus cycle terminated. Backplane FPGA will increment the message counter while it is receiving the data. Maximum number of re-send is 8. If the re-send number exceeds 8, backplane FPGA will terminate the bus cycle by releasing LBOARDSEL. Backplane FPGA will send out the interrupt to main processor and toggle the corresponding bit in interrupt status register as well. XI is also reset back to idle state due to release of LBOARDSEL signal.

Unlike previous source measure switching systems, where the main firmware required a certain amount of card awareness in one form or another, the present invention takes a different tack of distributed intelligence. It is possible using careful abstraction and compartmentalization, to create two separate pieces of firmware that communicate with each other in a highly-generic sense, without revealing or requiring any knowledge of how the other works internally.

If the abstraction and compartmentalization is divided cleanly between firmware servicing the main source measure switching system instrument, and that provided by a particular card to service itself, the possibility of introducing new cards with support for previously undefined features becomes a reality. This can all be done without requiring main firmware updates, provided the role of the main firmware is limited to overall message routing, system supervision, and coordination activities between the outside world and individual cards present in the source measure switching system.

In practice, building the required level of abstraction and compartmentalization is tricky. For starters, dynamically bringing two or more completely different pieces of firmware together without recompilation and relinking necessitates the use of a sophisticated operating system to carefully manage the interactions through pipes, sockets, file systems, and/or dynamic libraries.

Figure 36:
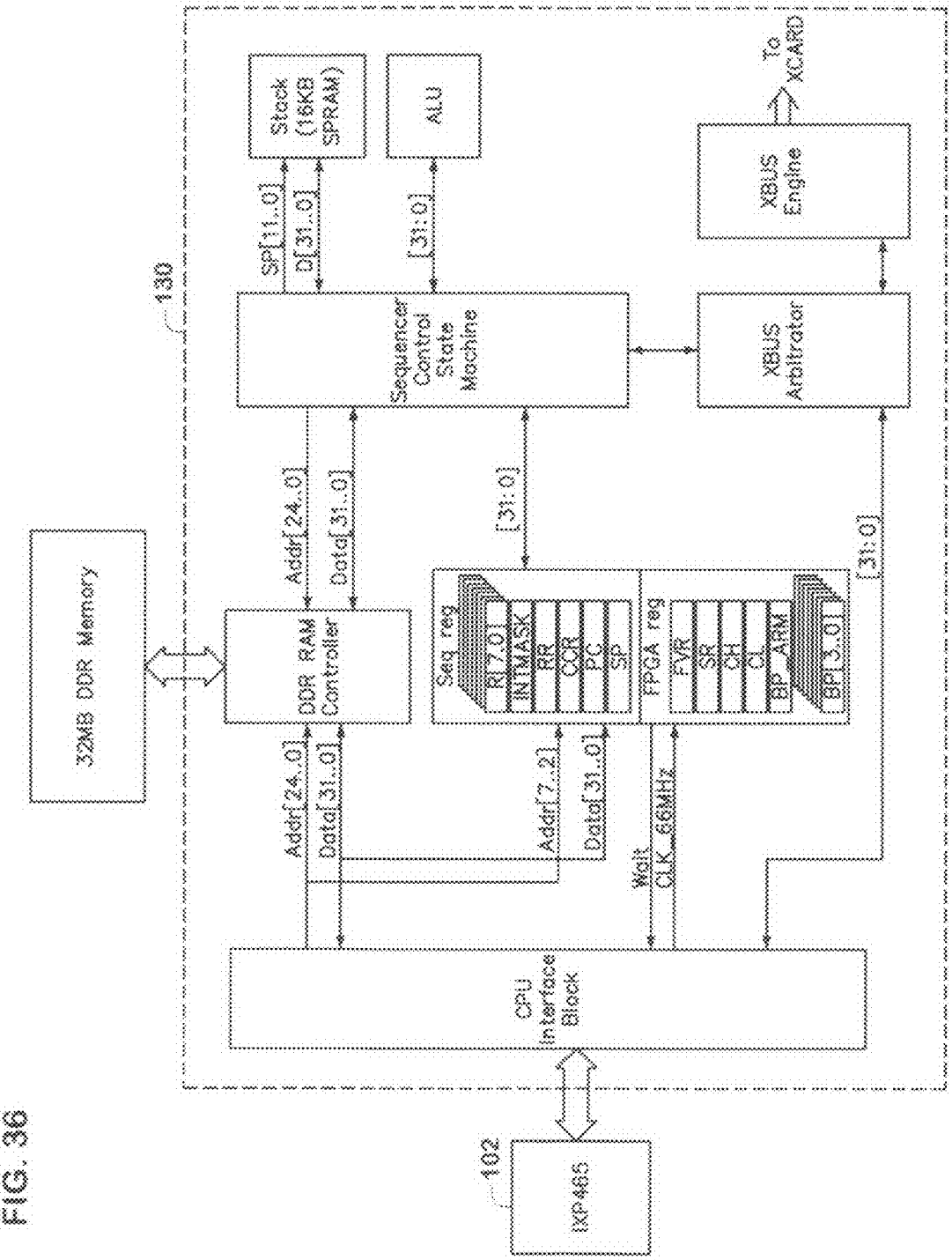
FIG. 36 shows a more detailed diagram of the sequencer in accordance with one embodiment of the invention.

In FIG. 36 there is shown a more detailed drawing of the sequence engine (sequencer) 130 highlighting the sequencer control state machine coupled to the plurality of sequencer registers and FPGA register sets. As well the RAM controller coupled to external RAM such as DDR RAM memory. A CPU interface block coupled the sequencer 130 to the external CPU 102. An XBUS arbitrator coupled to an XBUS engine control the operation of the cards (modules such as instrumentation cards, etc.) attached to the XBUS. An Arithmetic Logic Unit performs mathematical computations for the sequencer control state machine and a 16 KB SPRAM provides added memory capability to the sequencer state machine.

Figure 8:
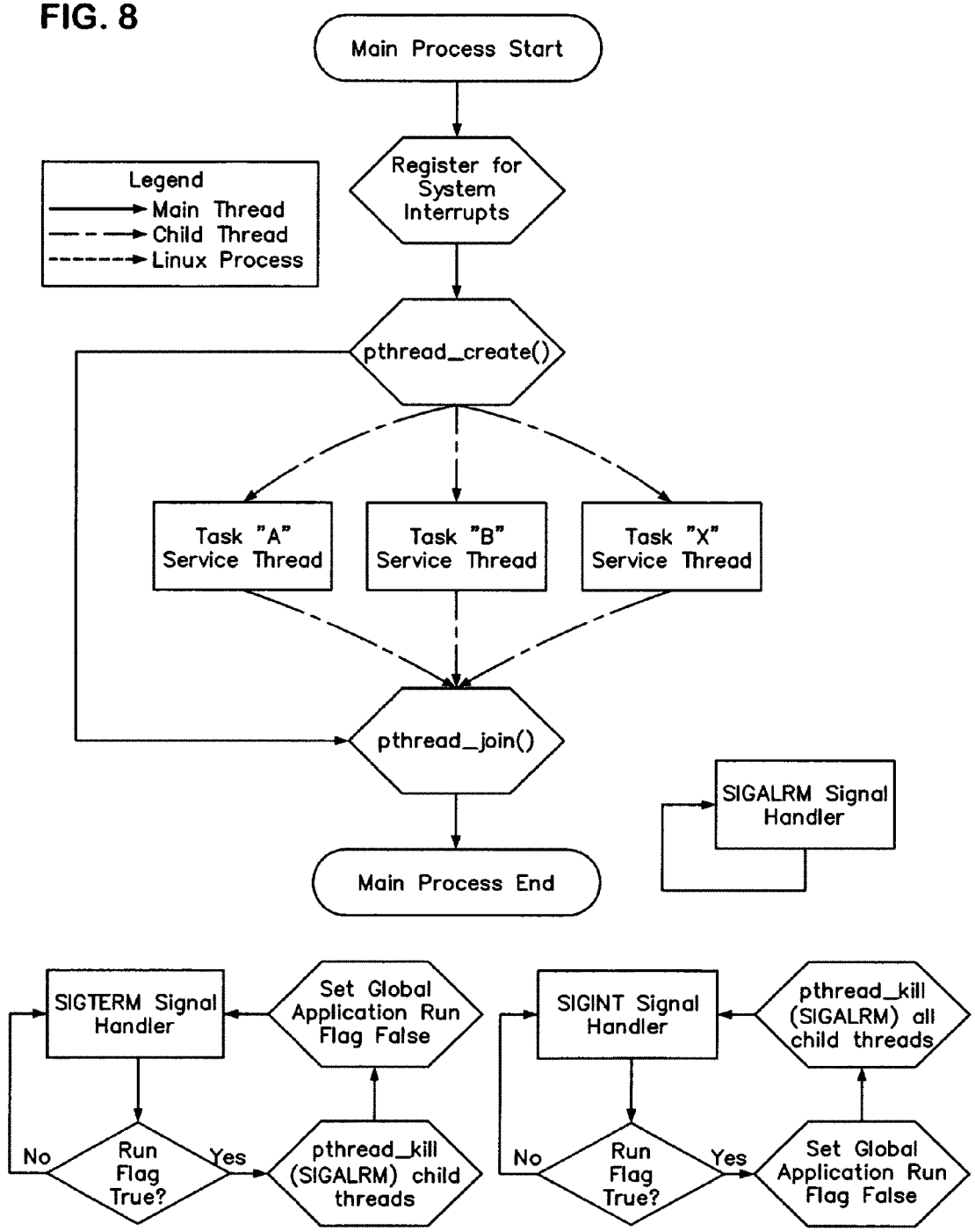
FIG. 8 shows a FIG. 8 shows a block diagram of a basic threading architecture of a core firmware process of the test system in accordance with an embodiment of the invention.

Core Firmware Process Threading Model
The basic threading model for the core firmware process implements a relatively simple thread management architecture shown in FIG. 8. As FIG. 8 illustrates, each child thread represents a significant task in the overall system software architecture. Each child thread spins off the parent along with a single set of shared process signal handlers to intercept and monitor several key Linux system signals. Since these signals play a very important role in the behavior of any Linux process, it makes sense to describe the signal handling philosophy of the core process. To start, the Linux kernel institutes a default policy of process termination for most signals that a givenprocess does not handle itself. Although less problematic on a diskless system, like the source measure switching system 100, it generally is not a good idea to let any program terminate in an uncontrolled manner. Firmware that may eventually evolve into systems where file system accesses occur in disk-based or database-driven systems leaves an open invitation for lost data/corruption.

Consequently, any well-written Linux process properly intercepts and handles the SIGTERM and SIGINT signals from the kernel. Additionally the source measure switching system's core firmware process also institutes and clears a global application run flag and then wakes sleeping child threads by sending thread-specific SIGALRM signals using a pthread_kill( ) function invocation with the SIGALRM flag set. This allows the program to cleanly terminate itself if either told to terminate through user interaction (normally not applicable for embedded systems) or forced to terminate because of an abnormal, unhandled fault. With the above mentioned signal handling philosophy in mind several rules must always be observed when writing new code:

1. Parent threads must SIGALRM any child thread they create.
2. All child threads must check the global application run flag immediately after coming out of any call that normally blocks. If the child thread is executing in an indefinite loop, the child thread must break out of the loop and perform any necessary cleanup or shutdown exercises if required before exiting.
3. SIGALRM signals only wake up threads that are blocked waiting for I/O. It will not wake up thread conditionals used to synchronize activities across multiple threads. If any child thread uses conditionals, the parent must also call a separate pthread_cond_signal( ) for each conditional flag utilized by child threads.
4. Parent threads must wait for their children to terminate and rejoin before exiting.
5. Parent or child threads that spawn separate heavy-weight processes and are intended to have a controlling and/or supervisory relationship are fully responsible for monitoring those processes. This implies that if the process is started by the thread, it must notify child processes of shutdown conditions (i.e. the thread itself is told to quit) and wait on them to prevent zombie processes.

Figure 12:
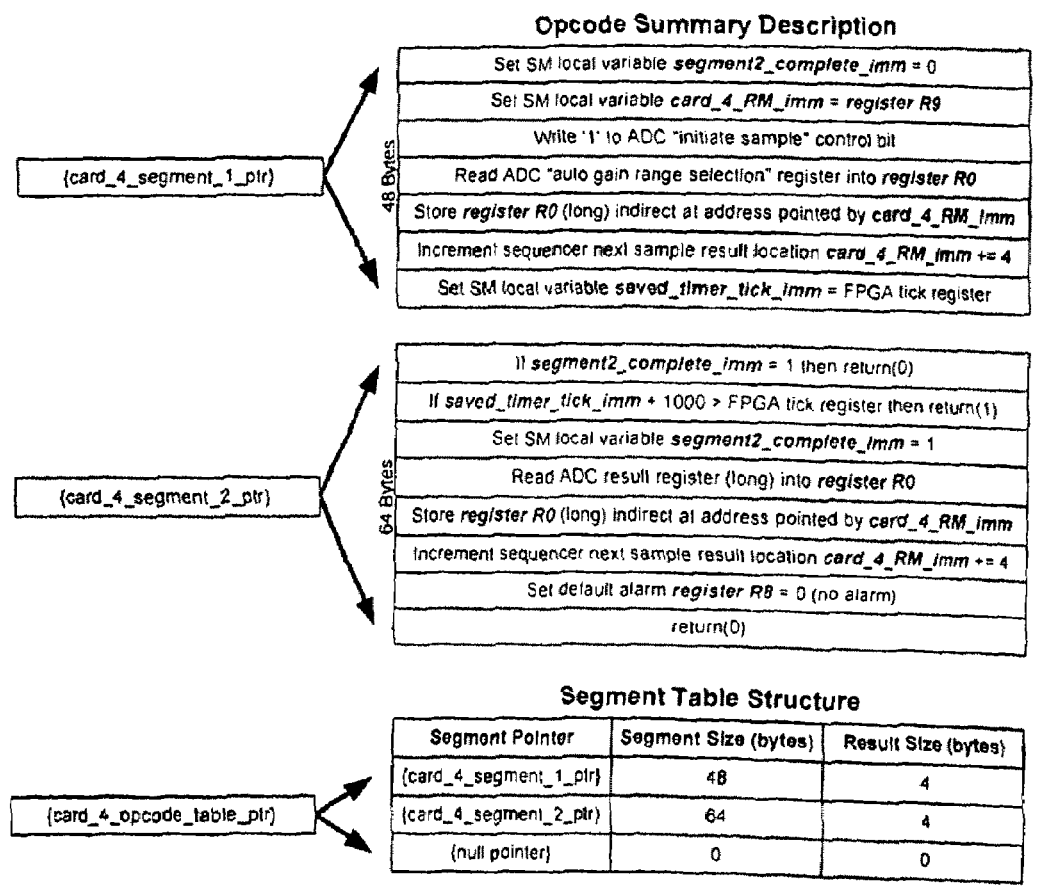
FIG. 12 shows an opcode segments and segment table in accordance with an embodiment of the invention.

FIG. 12 shows a detailed block diagram of a test system in accordance with an embodiment of the invention, while FIG. 13 highlights a block diagram of the backplane board for test system 100. In FIG. 14 a diagram of a trigger circuit for use in test system 100 is shown and FIG. 15 shows a trigger router in accordance with an embodiment of the invention.

Figure 15:
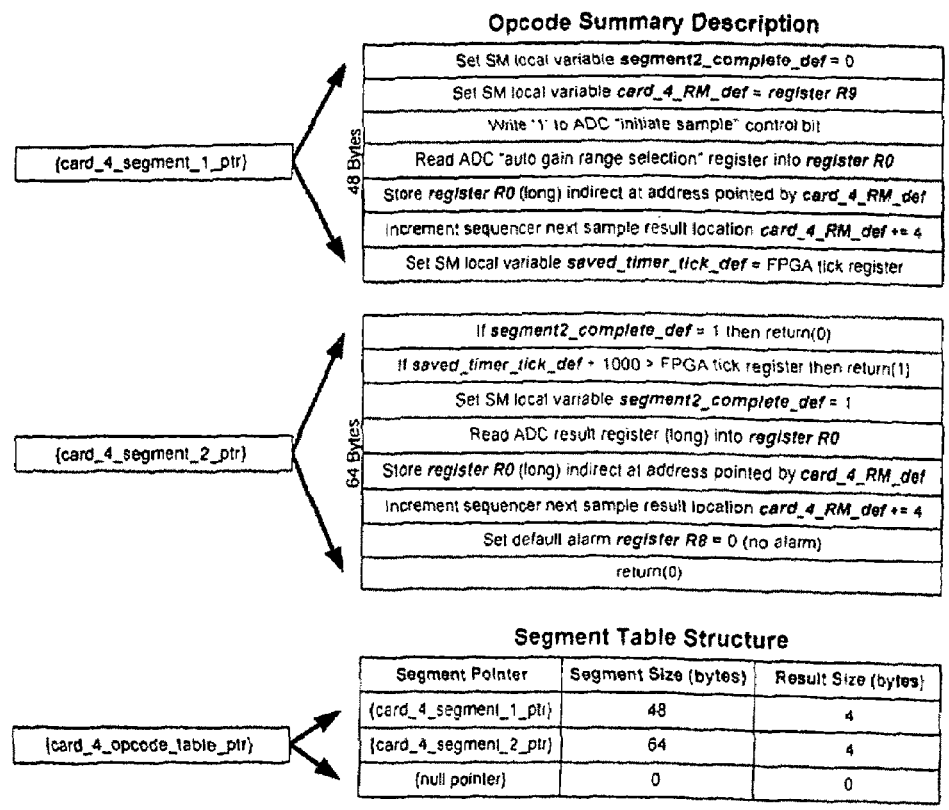
FIG. 15 shows a block diagram of opcode segments and a segment table in accordance with an embodiment of the invention.

The trigger router shown in FIG. 15 shown in FIG. 15 includes a plurality of trigger input ports and a plurality of trigger output ports. The plurality of trigger input ports are coupled to the X-bus and the PXI-bus sources as well as external triggers and a trigger from a SCAN. Coupled to the plurality of trigger input ports is a programmable input sensitivity control circuit used for independently programming the trigger sensitivity for each of the plurality of input triggers for positive-edge sensitivity, negative-edge sensitivity, high state sensitivity or low state sensitivity. Coupled to the plurality of output ports is a programmable output sensitivity control circuit for independently programming the trigger sensitivity of each of the plurality of output triggers for positive-edge sensitivity, negative-edge sensitivity, high state sensitivity or low state sensitivity. The trigger router shown in FIG. 15 is preferably located within the sequencer (sequence engine) which in an embodiment comprises a Field Programmable Gate Array (FPGA).

As shown in FIG. 15, a delay circuit can be used to delay signals flowing from the trigger router matrix to the plurality of output ports. Show on the left hand side of FIG. 15 is a group of trigger input control registers coupled to the input side of the trigger router matrix and a group of trigger output control registers coupled to the output portion of the trigger router matrix. These input and output control registers have been previously described above. Also shown are multiple external trigger inputs, an auto trigger input on the input side as well as an external trigger output and a trigger to scan line on the output side. The trigger matrices on the input and output sides can be designed using relays or other well known switching elements in order to allow any one or more of the inputs to interconnect with one or more of the outputs.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A test system, comprising:
   a sequencer;
   a Central Processing Unit (CPU) coupled to the sequencer; and
   an X-Bus coupled to the deterministic sequencer that can pipeline/burst data in block memory-mapped transfer modes.

2. A test system as defined in claim 1, wherein the sequencer is used to construct sequences for immediate and deferred execution.

3. A test system as defined in claim 1, wherein the sequencer can execute opcode instructions having potentially indefinite completion times and perform data memory management.

4. A test system as defined in claim 1, further comprising one or more asynchronous inputs coupled to the sequencer, and the sequencer can monitor the one or more asynchronous inputs without interrupts.

5. A test system as defined in claim 1, wherein the sequencer is sequential and deterministic to approximately ten microsecond resolution.

6. A test system as defined in claim 1, wherein the X-Bus includes a differential and a single-ended analog bus.

7. A test system as defined in claim 6, wherein the X-bus includes customizable trigger routing between modules that are coupled to the X-bus.

8. A test system as defined in claim 7, further comprising a fully configurable trigger input and trigger output routing matrix.

9. A test system as defined in claim 8, wherein the sequencer comprises a Field Programmable Gate Array (FPGA).

10. A test system as defined in claim 1, further comprising a PXI bus coupled to the CPU.

11. A test system as defined in claim 1, wherein the sequencer includes dedicated state machines for controlling bus communications.

12. A test system as defined in claim 1, wherein the sequencer comprises a first sequencer for immediate command execution and a second sequencer for deferred execution in a sequence/scan mode.

13. A test system as defined in claim 1, wherein the X-Bus comprises a bi-directional serial bus including four data lines, one data strobe signal line, one free-running clock line and two acknowledge signal lines.

14. A test system, comprising:
- a deterministic and sequential sequence engine, the sequence engine includes dedicated state machines for controlling bus communications;
- a memory coupled to the sequence engine for storing sequence information and data;
- a Central Processing Unit (CPU) coupled to the sequence engine; and
- wherein the sequence engine comprises a first sequencer for immediate command execution and a second sequencer for deferred execution in a sequence/scan mode.

15. A test system, comprising:
- a deterministic and sequential sequence engine;
- a memory coupled to the sequence engine for storing sequence information and data;
- a Central Processing Unit (CPU) coupled to the sequence engine; and
- a plurality of asynchronous inputs coupled to the sequence engine and the sequence engine monitors the plurality of asynchronous inputs without interrupt.

16. A test system as defined in claim 15, further comprising an X-bus coupled to the sequence engine, the X-bus allowing for coupling of one or more instrument modules, and each of the one or more instrument modules includes a physical memory space that is accessed in block memory mapped transfers to and from a main memory located in the CPU.

17. A test system as defined in claim 16, further comprising an analog bus coupled to the X-Bus that allows for multiple DMMs to run on separate analog bus lines.

18. A test system, comprising:
- a deterministic and sequential sequence engine;
- a memory coupled to the sequence engine for storing sequence information and data;
- a Central Processing Unit (CPU) coupled to the sequence engine;
- at least one test module coupled to the sequence engine; and
- a virtual memory transport mechanism for providing memory access for the at least one test module.

19. A sequencer for use in a test system, the sequencer comprising:
- a Central Processing Unit (CPU) interface;
- a sequencer control state machine coupled to the CPU interface for generating sequences for immediate and deferred execution; and
- a plurality of sequencer registers coupled to the sequencer control state machine.

20. A sequencer as defined in claim 19, further comprising:
- a bus arbitrator coupled to the sequencer control state machine.

21. A sequencer as defined in claim 20 further comprising:
- a SCPI parser coupled to the sequencer control state machine for generating a card state change notification when a card coupled to the bus arbitrator changes state.

22. A sequencer as defined in claim 20, wherein the SCPI parser also generates sequencer arm/disarm change notifications when the sequencer control state machine is placed in armed or disarmed state.

* * * * *